(12) United States Patent
Korepanov

(10) Patent No.: US 12,132,786 B1
(45) Date of Patent: *Oct. 29, 2024

(54) ORCHESTRATING A REMOTE SESSION ACROSS MULTIPLE DEVICES

(71) Applicant: PARALLELS INTERNATIONAL GmbH, Schaffhausen (CH)

(72) Inventor: Evgeniy Korepanov, Moscow (RU)

(73) Assignee: Parallels International GmbH, Schaffhausen (CH)

( * ) Notice: Subject to any disclaimer, the term of this patent is extended or adjusted under 35 U.S.C. 154(b) by 22 days.

This patent is subject to a terminal disclaimer.

(21) Appl. No.: 18/060,075

(22) Filed: Nov. 30, 2022

Related U.S. Application Data

(63) Continuation of application No. 17/218,871, filed on Mar. 31, 2021, now Pat. No. 11,528,327.

(51) Int. Cl.
*H04L 67/141* (2022.01)
*H04L 67/142* (2022.01)

(52) U.S. Cl.
CPC .......... *H04L 67/141* (2013.01); *H04L 67/142* (2013.01)

(58) Field of Classification Search
CPC .................................................. H04L 67/141
See application file for complete search history.

(56) References Cited

U.S. PATENT DOCUMENTS

| | | | |
|---|---|---|---|
| 10,146,629 B1* | 12/2018 | Yadav | G06F 11/1461 |
| 10,387,174 B2* | 8/2019 | Zhang | G06F 3/1423 |
| 11,017,013 B2 | 5/2021 | Zhang | |
| 11,108,868 B2* | 8/2021 | San | H04L 65/403 |
| 2007/0296643 A1* | 12/2007 | Ben-Shachar | G06F 3/1438 345/1.1 |
| 2011/0208804 A1 | 8/2011 | Kuzhiyii et al. | |
| 2011/0214063 A1* | 9/2011 | Saul | G06F 3/0481 715/740 |
| 2013/0151598 A1 | 6/2013 | Fu et al. | |
| 2015/0089497 A1 | 3/2015 | Borzycki et al. | |
| 2015/0120807 A1 | 4/2015 | Bharadwaj | |
| 2015/0381418 A1 | 12/2015 | Fausak et al. | |
| 2016/0147499 A1 | 5/2016 | Ryu | |
| 2016/0246787 A1* | 8/2016 | Zhang | G06F 16/172 |
| 2017/0177613 A1 | 6/2017 | Sharma et al. | |

(Continued)

FOREIGN PATENT DOCUMENTS

CN 104704448 B * 12/2017 ............... G06F 3/01

*Primary Examiner* — Alina A Boutah
(74) *Attorney, Agent, or Firm* — Rosenberg, Klein & Lee

(57) ABSTRACT

Remote applications within remote sessions and local applications do not behave similarly to provide users with a seamless experience. For example, a user may exploit multiple monitors with a local application but cannot with a remote application. Accordingly, embodiments of the invention provide users with the ability to exploit multiple monitors within a single remote session in a manner similar to the one in which they utilize multiple monitors on their desktop computer, laptop etc. Other embodiments extend this so that a user can exploit multiple client devices within a single remote session such that whilst the remote session is established upon a user's portable electronic device, for example, they can also exploit the keyboard, mouse, and monitor of their fixed electronic device for all or part of the session or exploit peripherals and other electronic devices associated with these client devices.

6 Claims, 16 Drawing Sheets

(56) References Cited

U.S. PATENT DOCUMENTS

| | | |
|---|---|---|
| 2018/0129510 A1 | 5/2018 | Zhang et al. |
| 2019/0244129 A1 | 8/2019 | Tabuchi et al. |
| 2019/0272185 A1 | 9/2019 | Mukraj et al. |
| 2020/0089888 A1 | 3/2020 | Kelly et al. |
| 2020/0228606 A1* | 7/2020 | San .................. H04L 67/141 |

* cited by examiner

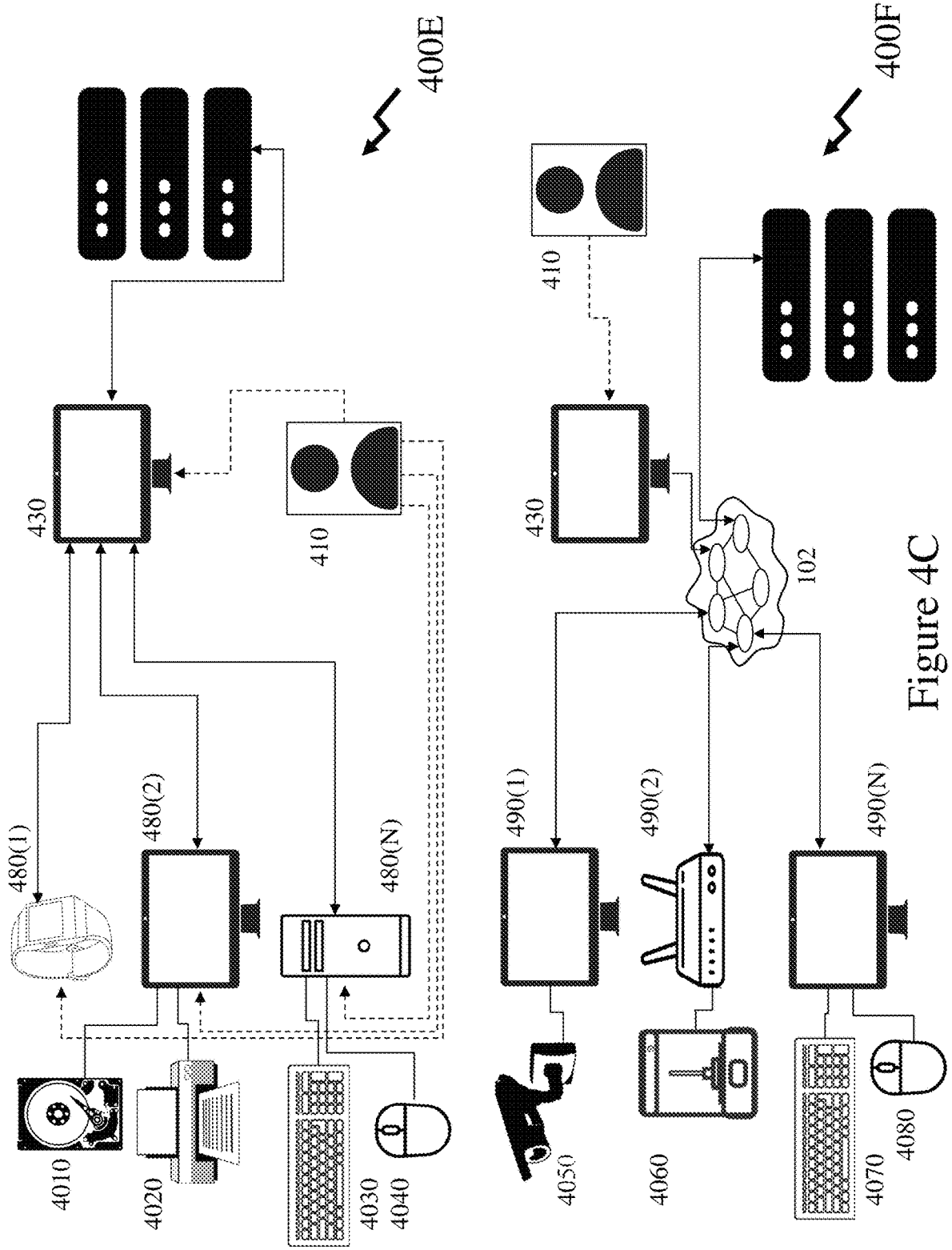

ORCHESTRATING A REMOTE SESSION ACROSS MULTIPLE DEVICES

CROSS-REFERENCE TO RELATED APPLICATIONS

This patent application claims the benefit of priority from U.S. patent application Ser. No. 17/218,871 filed Mar. 31, 2021; the entire contents of which are incorporated herein by reference.

FIELD OF THE INVENTION

This patent application relates to remote sessions and more particularly to exploiting multiple devices to allow one or more users to work with the remote applications within a remote session.

BACKGROUND OF THE INVENTION

Virtual machines provide users with an ability to work with a discrete application, multiple applications, or whole desktops where these applications, desktops etc. are hosted on a remote system and provided through a remote session or sessions. These users may also, either discretely or concurrently, employ local applications on a local device (commonly referred to as a client device). Accordingly, from the user's perspective it is important for remote applications to behave as close to the local applications as possible to provide users with a seamless experience when they work within a mixed environment, i.e. one with remote applications and local applications.

Amongst the aspects of local applications upon a user's client device is the ability for the user to exploit multiple monitors such that different applications can be concurrently displayed upon different monitors thereby providing the user with improved visual usability as each application can be sized to the user's requirements without having to be concerned with displaying the concurrent applications within the constraints of a single monitor. Accordingly, it would be beneficial to provide users with a similar ability to exploit multiple monitors within a single remote session.

However, the inventors have also considered that it would be beneficial to extend this such that a user can exploit multiple client devices within a single remote session such that whilst the remote session is established upon a user's portable electronic device, for example, they can also exploit the keyboard, mouse, and monitor of their fixed electronic device for all or part of the session. Accordingly, the inventors have established methodologies to support multiple client devices within a single remote session for a single user or by logical extension to multiple users across these multiple client devices.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to remote sessions and more particularly to exploiting multiple devices to allow one or more users to work with the remote applications within a remote session.

In accordance with an embodiment of the invention there is provided a method comprising
 providing an orchestrating client device;
 providing one or more client devices;
 providing a remote system;
 establishing a remote session upon the remote system with the orchestrating client device;
 establishing a virtual session group associated with the remote session defining virtual sessions for the orchestrating client device and the one or more client devices;
 establishing a first portion of the remote session upon the orchestrating client device established in dependence upon the session of the virtual session group associated with the orchestrating client device; and
 establishing a second portion of the remote session upon each client device of the one or more client devices, each second portion of the remote session established in dependence upon the session of the virtual session group associated with the client device of the one or more client devices.

In accordance with an embodiment of the invention there are provided one or more non-transitory computer-readable storage media comprising executable instructions that, when executed by one or more processors, cause the one or more processors to:
 establish a remote session upon a remote system for an orchestrating client device;
 establish a virtual session group associated with the remote session defining virtual sessions for the orchestrating client device and one or more client devices forming part of the remote session;
 establish a first portion of the remote session upon the orchestrating client device established in dependence upon the session of the virtual session group associated with the orchestrating client device; and
 render a second portion of the remote session upon each client device of the one or more client devices, each second portion of the remote session established in dependence upon the session of the virtual session group associated with the client device of the one or more client devices.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 4A to 4C depict exemplary configurations for configuring multiple client devices in conjunction with a main client device to orchestrate a remote session from a remote server according to embodiments of the invention;

DETAILED DESCRIPTION

Figure 1:
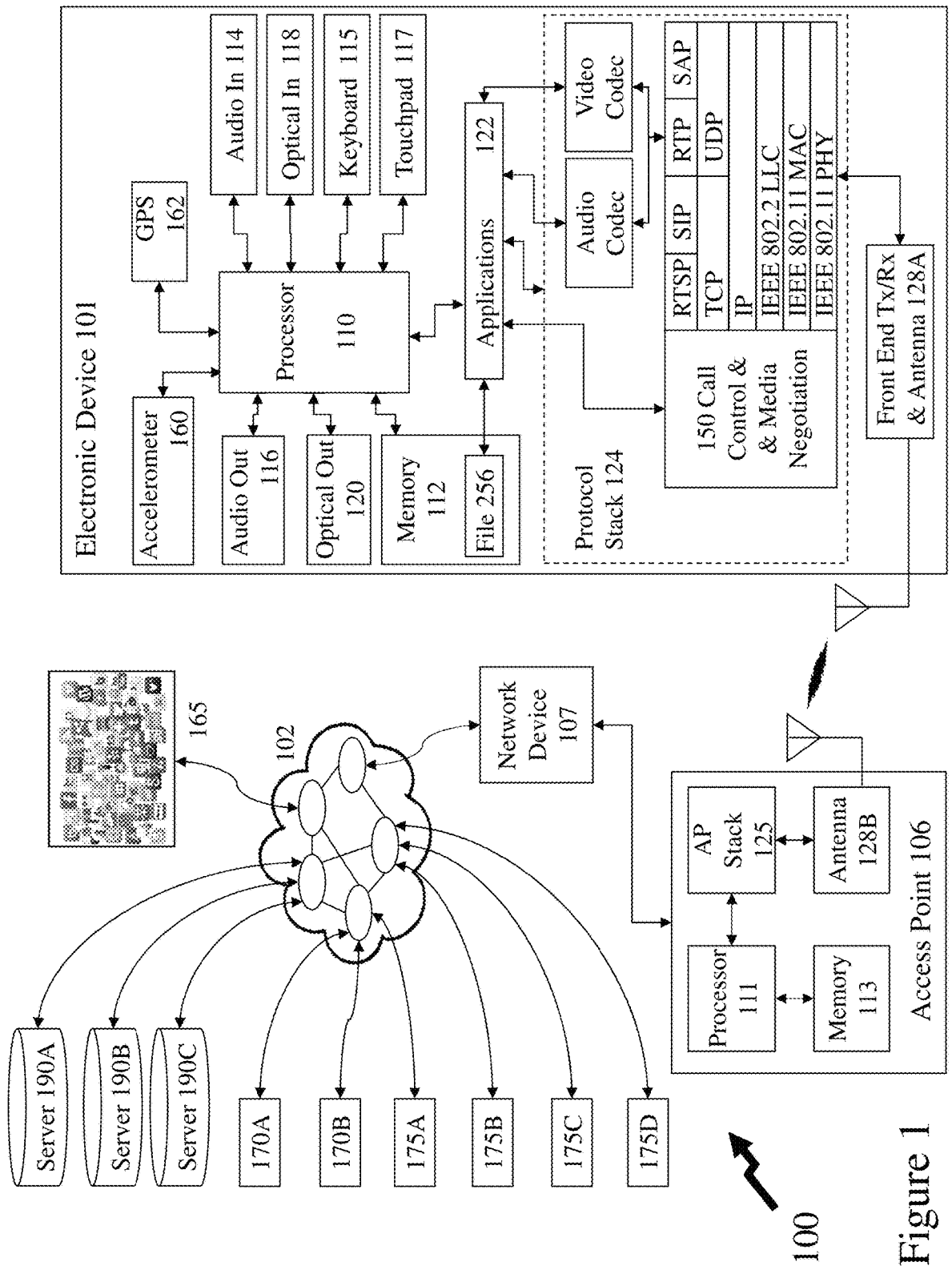
FIG. 1 depicts an exemplary electronic device and network supporting embodiments of the invention.

The present description is directed to remote sessions and more particularly to exploiting multiple devices to allow one or more users to work with the remote applications within a remote session.

The ensuing description provides representative embodiment(s) only, and is not intended to limit the scope, applicability, or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers, or groups thereof and that the terms are not to be construed as specifying components, features, steps, or integers. Likewise, the phrase "consisting essentially of", and grammatical variants thereof, when used herein is not to be construed as excluding additional components, steps, features integers or groups thereof but rather that the additional features, integers, steps, components, or groups thereof do not materially alter the basic and novel characteristics of the claimed composition, device or method. If the specification or claims refer to "an additional" element, that does not preclude there being more than one of the additional element.

A "portable electronic device" (PED) as used herein may refer to, but is not limited to, a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device, and an electronic reader.

A "fixed electronic device" (FED) as used herein may refer to, but is not limited to, a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "wearable device" or "wearable sensor" (Wearable Device) as used herein may refer to, but is not limited to, an electronic device that is worn by a user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

A "client device" as used herein may refer to, but is not limited to, a PED, FED or Wearable Device upon which a user can access directly a file or files which are stored locally upon the PED, FED or Wearable Device, which are referred to as "local files", and/or a file or files which are stored remotely to the PED, FED or Wearable Device, which are referred to as "remote files", and accessed through one or more network connections or interfaces to a storage device.

A "server" as used herein may refer to, but is not limited to, one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

A "software application" (commonly referred to as an "application" or "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "graphical user interface" (GUI) as used herein may refer to, but is not limited to, a form of user interface for a PED, FED, Wearable Device, software application or operating system which allows a user to interact through graphical icons with or without an audio indicator for the selection of features, actions, etc. rather than a text-based user interface, a typed command label or text navigation.

An "enterprise" as used herein may refer to, but is not limited to, a provider of a service and/or a product to a user, customer, or consumer and may include, but is not limited to, a retailer, an online retailer, a market, an online marketplace, a manufacturer, a utility, a Government organization, a service provider, and a third party service provider.

A "service provider" as used herein may refer to, but is not limited to, a provider of a service and/or a product to an enterprise and/or individual and/or group of individuals and/or a device comprising a microprocessor.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals. This includes, but is not limited to, private individuals, employees of organizations and/or enterprises, members of organizations, men, and women. In its broadest sense the user may further include, but not be limited to, software systems, mechanical systems, robotic systems, android systems, etc. that may be characterised by an ability to exploit one or more embodiments of the invention. A user may also be associated through one or more accounts and/or profiles with one or more of a service provider, third party provider, enterprise, social network, social media etc. via a dashboard, web service, website, software plug-in, software application, and graphical user interface.

"Biometric" information as used herein may refer to, but is not limited to, data relating to a user characterised by data relating to a subset of conditions including, but not limited to, their environment, medical condition, biological condition, physiological condition, chemical condition, ambient environment condition, position condition, neurological condition, drug condition, and one or more specific aspects of one or more of these said conditions. Accordingly, such biometric information may include, but not be limited, blood oxygenation, blood pressure, blood flow rate, heart rate, temperate, fluidic pH, viscosity, particulate content, solids content, altitude, vibration, motion, perspiration, EEG, ECG, energy level, etc. In addition, biometric information may include data relating to physiological characteristics related to the shape and/or condition of the body wherein examples may include, but are not limited to, fingerprint, facial geometry, baldness, DNA, hand geometry, odour, and scent. Biometric information may also include data relating to behavioral characteristics, including but not limited to, typing rhythm, gait, and voice.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed, or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "profile" as used herein may refer to, but is not limited to, a computer and/or microprocessor readable data file comprising data relating to settings and/or limits of an adult device. Such profiles may be established by a manufacturer/supplier/provider of a device, service, etc. or they may be established by a user through a user interface for a device, a service, or a PED/FED in communication with a device, another device, a server or a service provider etc.

A "computer file" (commonly known as a file) as used herein may refer to, but is not limited to, a computer resource for recording data discretely in a computer storage device, this data being electronic content. A file may be defined by one of different types of computer files, designed for different purposes. A file can be opened, read, modified, copied, and closed with one or more software applications an arbitrary number of times. Typically, files are organized in a file system which can be used on numerous different types of storage device exploiting different kinds of media which keeps track of where the files are located on the storage device(s) and enables user access. The format of a file is typically defined by its content since a file is solely a container for data, although, on some platforms the format is usually indicated by its filename extension, specifying the rules for how the bytes must be organized and interpreted meaningfully.

A "local file" as used herein may refer to, but is not limited to, a file, i.e. electronic content, which is stored directly upon a client device, e.g. a PED, FED, or Wearable Device, within a file system of a client device.

A "remote file" as used herein may refer to, but is not limited to, a file, i.e. electronic content, which is stored externally to a client's device and is accessible either through the file system of the client device or through exploitation of one or more protocols for providing a client device with shared file access to the file stored upon a remote storage device. Storing externally to a client's device may include, but not be limited to, storing one or more files on a removable memory storage device which can be connected to the client device, for example a Universal Serial Bus memory (commonly referred to as a memory stick) or an external drive (e.g. external hard disk drive (HDD)) coupled to a wired or wireless interface of the client device. A remote storage device may include, but not be limited to, a remote HDD accessible to the client device via a network, a cloud storage account or cloud storage server accessible via a network (e.g. the Internet, Local Area Network (LAN), etc.) a remote server accessible via a network (e.g. via Ethernet, Wi-Fi, etc.).

"Metadata" as used herein may refer to, but is not limited to, information stored as data that provides information about other data and may include, but not limited to, descriptive metadata, structural metadata, administrative metadata, reference metadata and statistical metadata. Descriptive metadata may describe a resource for purposes such as discovery and identification and may include, but not be limited to, elements such as title, abstract, author, and keywords. Structural metadata relates to containers of data and indicates how compound objects are assembled and may include, but not be limited to, how pages are ordered to form chapters, and typically describes the types, versions, relationships, and other characteristics of digital materials. Administrative metadata may provide information employed in managing a resource and may include, but not be limited to, when and how it was created, file type, technical information, and who can access it. Reference metadata may describe the contents and quality of statistical data whereas statistical metadata may also describe processes that collect, process, or produce statistical data. Statistical metadata may also be referred to as process data.

A "wireless interface" as used herein may refer to, but is not limited to, an interface for a PED, FED, or Wearable Device which exploits electromagnetic signals transmitted through the air. Typically, a wireless interface may exploit microwave signals and/or RF signals, but it may also exploit visible optical signals, infrared optical signals, acoustic signals, optical signals, ultrasound signals, hypersound signals, etc.

A "wired interface" as used herein may refer to, but is not limited to, an interface for a PED, FED, or Wearable Device which exploits electrical signals transmitted through an electrical cable or cables. Typically, a wired interface involves a plug or socket on the electronic device which interfaces to a matching socket or plug on the electrical cable(s). An electrical cable may include, but not be limited, coaxial cable, an electrical mains cable, an electrical cable for serial communications, an electrical cable for parallel communications comprising multiple signal lines, etc.

A "geofence" as used herein may refer to, but is not limited to, a virtual perimeter for a real-world geographic area which can be statically defined or dynamically generated such as in a zone around a PED's location. A geofence may be a predefined set of boundaries which align with a real world boundary, e.g. state line, country etc., or generated boundary such as a school zone, neighborhood, etc. A geofence may be defined also by an electronic device's ability to access one or more other electronic devices, e.g. beacons, wireless antennas etc.

An "artificial intelligence system" (referred to hereafter as artificial intelligence, AI) as used herein may refer to, but is not limited to, machine intelligence or machine learning in contrast to natural intelligence. An AI may refer to analytical, human inspired, or humanized artificial intelligence. An AI may refer to the use of one or more machine learning algorithms and/or processes. An AI may employ one or more of an artificial network, decision trees, support vector machines, Bayesian networks, and genetic algorithms. An AI may employ a training model or federated learning.

"Machine Learning" (ML) or more specifically machine learning processes as used herein refers to, but is not limited, to programs, algorithms, or software tools, which allow a given device or program to learn to adapt its functionality based on information processed by it or by other independent processes. These learning processes are in practice, gathered from the result of said process which produce data and or algorithms that lend themselves to prediction. This prediction process allows ML-capable devices to behave according to guidelines initially established within its own programming but evolved as a result of the ML. A machine learning algorithm or machining learning process as employed by an AI may include, but not be limited to, supervised learning, unsupervised learning, cluster analysis, reinforcement learning, feature learning, sparse dictionary learning, anomaly detection, association rule learning, inductive logic programming.

A "barcode" as used herein may refer to, but is not limited to, a method of representing data in a visual, machine-readable form. A barcode may represent data by varying the widths and spacings of parallel lines such as within linear or one-dimensional (1D) or using rectangles, dots, hexagons, and other geometric patterns, called matrix codes or two-dimensional (2D) barcodes. A barcode may comply with a standard or be application specific in order to represent the encoded alphanumeric data.

A "monitor" as used herein may refer to, but is not limited to, a display device, namely an output device for presentation of information in a visual format such as rendering content to a user. A "monitor" may exploit one or more display technologies including electroluminescent (ELD) displays, liquid crystal displays (LCDs), light-emitting diode (LED) backlit LCDs, thin-film transistor (TFT) LCDs, LED displays, organic LED displays, active matrix organic LED (AMOLED) display, plasma display (PDP), quantum dot LED (QLED) display, and cathode ray tube (CRT).

A "session host" as used herein may refer to, but is not limited to, a software application, device or other technology which supports the provisioning of a single user session or multiple user sessions to one or more users. A session host may include, but is not limited to, a virtual machine, a thin client such as Microsoft™ Remote Desktop Session Host (RDSH), a containerized environment, a containerized application, a client side software architecture such as Linux XServer, and an application allowing remote access to a computer such as Microsoft Remote Desktop and Apple Remote Desktop.

Now referring to FIG. 1 there is depicted a schematic 100 of a network to which an Electronic Device 101 supporting Remote Access System (RAS) Systems, Applications and Platforms (SAPs) and RAS-SAP features according to embodiments of the invention is connected. Electronic Device 101 may, for example, be a PED, a FED, or a wearable device and may include additional elements above and beyond those described and depicted. Also depicted in conjunction with the Electronic Device 101 are exemplary internal and/or external elements forming part of a simplified functional diagram of an Electronic Device 101 within an overall simplified schematic of a system supporting SAP features according to embodiments of the invention which include includes an Access Point (AP) 106, such as a Wi-Fi AP for example, a Network Device 107, such as a communication server, streaming media server, and a router. The Network Device 107 may be coupled to the AP 106 via any combination of networks, wired, wireless and/or optical communication links. Also connected to the Network 102 are Social Media Networks (SOCNETS) 165; first and second remote systems 170A and 170B respectively; first and second websites 175A and 175B respectively; first and third 3rd party service providers 175C and 175E respectively; and first to third servers 190A to 190C, respectively.

The Electronic device 101 includes one or more Processors 110 and a Memory 112 coupled to Processor(s) 110. AP 106 also includes one or more Processors 111 and a Memory 113 coupled to Processor(s) 210. A non-exhaustive list of examples for any of Processors 110 and 111 includes a central processing unit (CPU), a digital signal processor (DSP), a reduced instruction set computer (RISC), a complex instruction set computer (CISC), a graphics processing unit (GPU) and the like. Furthermore, any of Processors 110 and 111 may be part of application specific integrated circuits (ASICs) or may be a part of application specific standard products (ASSPs). A non-exhaustive list of examples for Memories 112 and 113 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic Device 101 may include an audio input element 214, for example a microphone, and an Audio Output Element 116, for example, a speaker, coupled to any of Processor(s) 110. Electronic Device 101 may include an Optical Input Element 218, for example, a video camera or camera, and an Optical Output Element 220, for example an LCD display, coupled to any of Processor(s) 110. Electronic Device 101 also includes a Keyboard 115 and Touchpad 117 which may for example be a physical keyboard and touchpad allowing the user to enter content or select functions within one of more Applications 122. Alternatively, the Keyboard 115 and Touchpad 117 may be predetermined regions of a touch sensitive element forming part of the display within the Electronic Device 101. The one or more Applications 122 that are typically stored in Memory 112 and are executable by any combination of Processor(s) 110. Electronic Device 101 also includes Accelerometer 160 providing three-dimensional motion input to the Processor (s) 110 and GPS 162 which provides geographical location information to Processor(s) 110. as described and depicted below in respect of FIGS. 2 and 3 respectively an Application 122 may support communications with a remote access system allowing one or more remote sessions to be established each associated with one or more Virtual Machines (VMs) allowing non-native applications (e.g. those requiring an Operating System (OS) different to that in execution upon the Processor 110) to be accessed and executed.

Electronic Device 101 includes a Protocol Stack 124 and AP 106 includes an AP Stack 125. Within Protocol Stack 124 is shown an IEEE 802.11 protocol stack but alternatively may exploit other protocol stacks such as an Internet Engineering Task Force (IETF) multimedia protocol stack for example or another protocol stack. Likewise, AP Stack 125 exploits a protocol stack but is not expanded for clarity. Elements of Protocol Stack 124 and AP Stack 125 may be implemented in any combination of software, firmware and/or hardware. Protocol Stack 124 includes an IEEE 802.11-compatible PHY module that is coupled to one or more Tx/Rx & Antenna Circuits 128A and an IEEE 802.11-compatible MAC module which is coupled to an IEEE 802.2-compatible LLC module. Protocol Stack 124 also includes modules for Network Layer IP, a transport layer User Datagram Protocol (UDP), a transport layer Transmission Control Protocol (TCP), a session layer Real Time Transport Protocol (RTP), a Session Announcement Protocol (SAP), a Session Initiation Protocol (SIP) and a Real Time Streaming Protocol (RTSP). Protocol Stack 124 includes a presentation layer Call Control and Media Negotiation module 150, one or more audio codecs and one or more video codecs. Applications 122 may be able to create maintain and/or terminate communication sessions with the Network Device 107 by way of AP 106 and therein via the Network 102 to one or more of Social Networks (SOCNETS) 165; first and second remote systems 170A and 170B respectively; first and second websites 175A and 175B respectively; first and third 3rd party service providers 175C and 175E respectively; and first to third servers 190A to 190C, respectively. As described below in respect of FIGS. 2 and 3 a Remote Access System may be executed by and/or accessed by the Electronic Device 101 via the Network 102 on one or more of first and second websites 175A and 175B respectively; first and third 3rd party service providers 175C and 175E respectively; and first to third servers 190A to 190C, respectively.

Typically, Applications 122 may activate any of the SAP, SIP, RTSP, and Call Control & Media Negotiation 150 modules for that purpose. Typically, information may propagate from the SAP, SIP, RTSP, Call Control & Media Negotiation 150 to the PHY module via the TCP module, IP module, LLC module and MAC module. It would be apparent to one skilled in the art that elements of the Electronic Device 101 may also be implemented within the AP 106 including but not limited to one or more elements of the Protocol Stack 124, including for example an IEEE 802.11-compatible PHY module, an IEEE 802.11-compatible MAC module, and an IEEE 802.2-compatible LLC module. The AP 106 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, and a call control & media negotiation module. Portable electronic devices (PEDs) and fixed electronic devices (FEDs) represented by Electronic Device 101 may include one or more additional wireless or wired interfaces in addition to or in replacement of the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1010, DSL, Dial-Up, DOCSIS, Ethernet, G.hn, ISDN, MoCA, PON, and Power line communication (PLC).

The Front End Tx/Rx & Antenna 128A wirelessly connects the Electronic Device 101 with the Antenna 128B on Access Point 206, wherein the Electronic Device 101 may support, for example, a national wireless standard such as GSM together with one or more local and/or personal area wireless protocols such as IEEE 802.11 a/b/g Wi-Fi, IEEE 802.16 WiMAX, and IEEE 802.15 Bluetooth for example. Accordingly, it would be evident to one skilled the art that the Electronic Device 101 may accordingly download original software and/or revisions for a variety of functions. In some embodiments of the invention the functions may not be implemented within the original as sold Electronic Device 101 and are only activated through a software/firmware revision and/or upgrade either discretely or in combination with a subscription or subscription upgrade for example. Accordingly, as will become evident in respect of the description below the Electronic Device 101 may provide a user with access to one or more RAS-SAPs including, but not limited to, software installed upon the Electronic Device 101 or software installed upon one or more remote systems such as those associated with Social Networks (SOCNETS) 165; first to fifth remote systems 170A to 170E respectively; first and second websites 175A and 175B respectively; and first to third 3rd party service provides 175C to 175E respectively; and first to third servers 190A to 190C respectively for example.

Accordingly, within the following description a remote system/server may form part or all of the Social Networks (SOCNETS) 165; first and second remote systems 170A and 170B respectively; first and second websites 175A and 175B respectively; first and third 3rd party service providers 175C and 175E respectively; and first to third servers 190A to 190C, respectively. Within the following description a local client device may be Electronic Device 101 such as a PED, FED or Wearable Device and may be associated with one or more of the Social Networks (SOCNETS) 165; first and second remote systems 170A and 170B respectively; first and second websites 175A and 175B respectively; first and third 3rd party service providers 175C and 175E respectively; and first to third servers 190A to 190C, respectively. Similarly, a storage system/server within the following descriptions may form part of or be associated within Social Networks (SOCNETS) 165; first and second remote systems 170A and 170B respectively; first and second websites 175A and 175B respectively; first and third 3rd party service providers 175C and 175E respectively; and first to third servers 190A to 190C, respectively.

Figure 2:
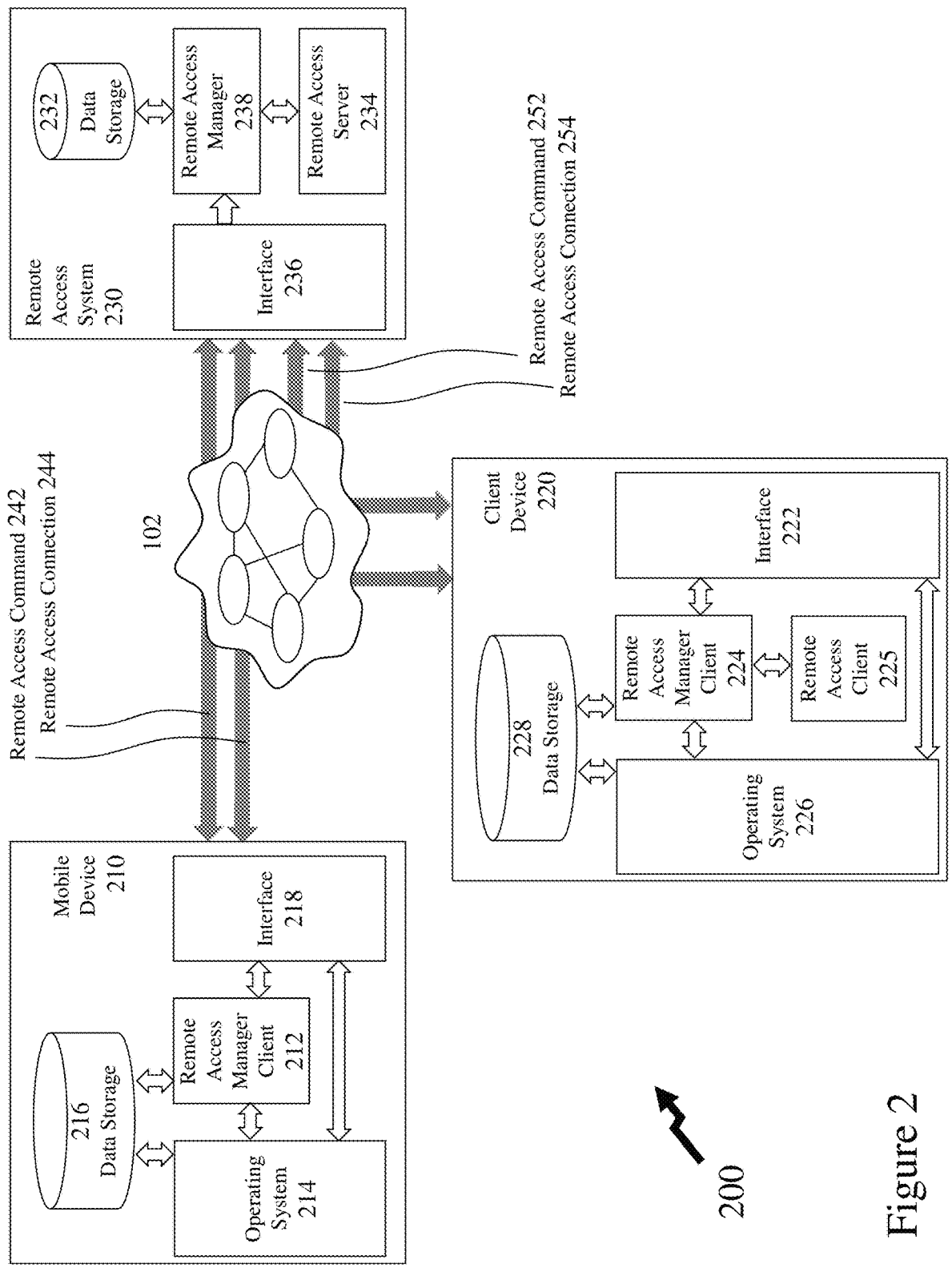
FIG. 2 depicts an exemplary block diagram of a system for initiating or transferring a remote access session between a mobile client and/or a client device and a remote access system supporting embodiments of the invention.

Now referring to FIG. 2 there is depicted a schematic diagram 200 depicting an exemplary configuration for initiating a remote access session for connecting a Mobile Device 210 to a Remote Access System 206 and/or a Client Device 220. As depicted the Mobile Device 210 is in communication with the Remote Access System 230 over a Network 102, such as a local area network (LAN), wide area network (WAN), or the Internet. Further, the Client Device 220 is in communication with the Remote Access System 230 over the Network 102. Optionally, the remote sessions of the Mobile Device 210 and the Client Device 220 are independent sessions. Optionally, within the Remote Access System 230 may transfer a session to the Client Device 220 when the Mobile Device 210 is in proximity to the Client Device 220 where the transferred session is either configured upon an existing established session or is established by the Client Device 220 in dependence upon a communication or communications from the Remote Access System 230. Optionally, the Remote Access System 230 may transfer a session to the Mobile Device 210 from the Client Device 220 when the Mobile Device 210 is initially in proximity to the Client Device 220 and then is moved out of proximity whilst the remote session is still active, where the transferred session is either configured upon an existing established session or is established by the Mobile Device 210 in dependence upon a communication or communications from the Remote Access System 230. The Mobile Device 210 and Client Device 220 may be associated with a common user or with different users. Optionally, the Remote Access System 230 may also host and/or initiate a remote access session at a predetermined time.

The Remote Access System 230 may include one or more computing devices that perform the operations of the Remote Access System 230 and may, for example be a server such as first to third Servers 190A to 190C respectively individually or in combination. It would be evident that the Mobile Device 210 may be a PED, FED, or Wearable Device. Accordingly, with a session involving only the Mobile Device 210 and the Remote Access System 230 the session is established, maintained, and terminated in dependence upon one or more Remote Access Commands 242 over a Remote Access Connection 244 between the Mobile Device 210 and the Remote Access System 230. Accordingly, with a session involving only the Client Device 220 and the Remote Access System 230 the session is established, maintained, and terminated in dependence upon one or more Remote Access Commands 224 over a Remote Access Connection 254 between the Client Device 220 and the Remote Access System 230. When the session involves both the Mobile Device 210 and the Client Device 220 with the Remote Access Server then the session is established, maintained, and terminated in dependence upon one or more Remote Access Commands 242 over a Remote Access Connection 244 between the Mobile Device 210 and the Remote Access System 230 and one or more Remote Access Commands 224 over a Remote Access Connection 254 between the Client Device 220 and the Remote Access System 230.

In each scenario one or more remote access sessions are established at the Remote Access System 230, either upon or in associated with a server such as first to third Servers 190A to 190C respectively in FIG. 1. The server, e.g. first Server 190A, may include one or more computing devices that perform the operations of the server. The server may be included in the Remote Access System 230 or another system that is separate and/or distinct from the Remote Access System 230 or the Remote Access System 230 may be in execution upon the server. A server application at the server initiates the one or more remote access sessions where initiating a remote access session may include, for example, executing boot-up and/or logon processes, such as running a script that automatically executes when the user logs in to the session, running applications from a folder designated as including applications to be automatically executed when the user logs in to the session, running services that automatically execute when the session starts and/or the user logs in to the session, and/or executing group policies or group policy preferences when the user logs in to the session. Alternatively, the remote access session may start the session and/or log in the user but only execute applications when these are triggered by one or more actions of the user upon the Mobile Device 210 and/or Client Device 220. In some implementations, the server application initiates the remote access session in response to determining that a remote access session has not already been initiated when a request from a device, e.g. Mobile Device 210 and/or Client Device 220, is received.

Figures 3A, 3B:
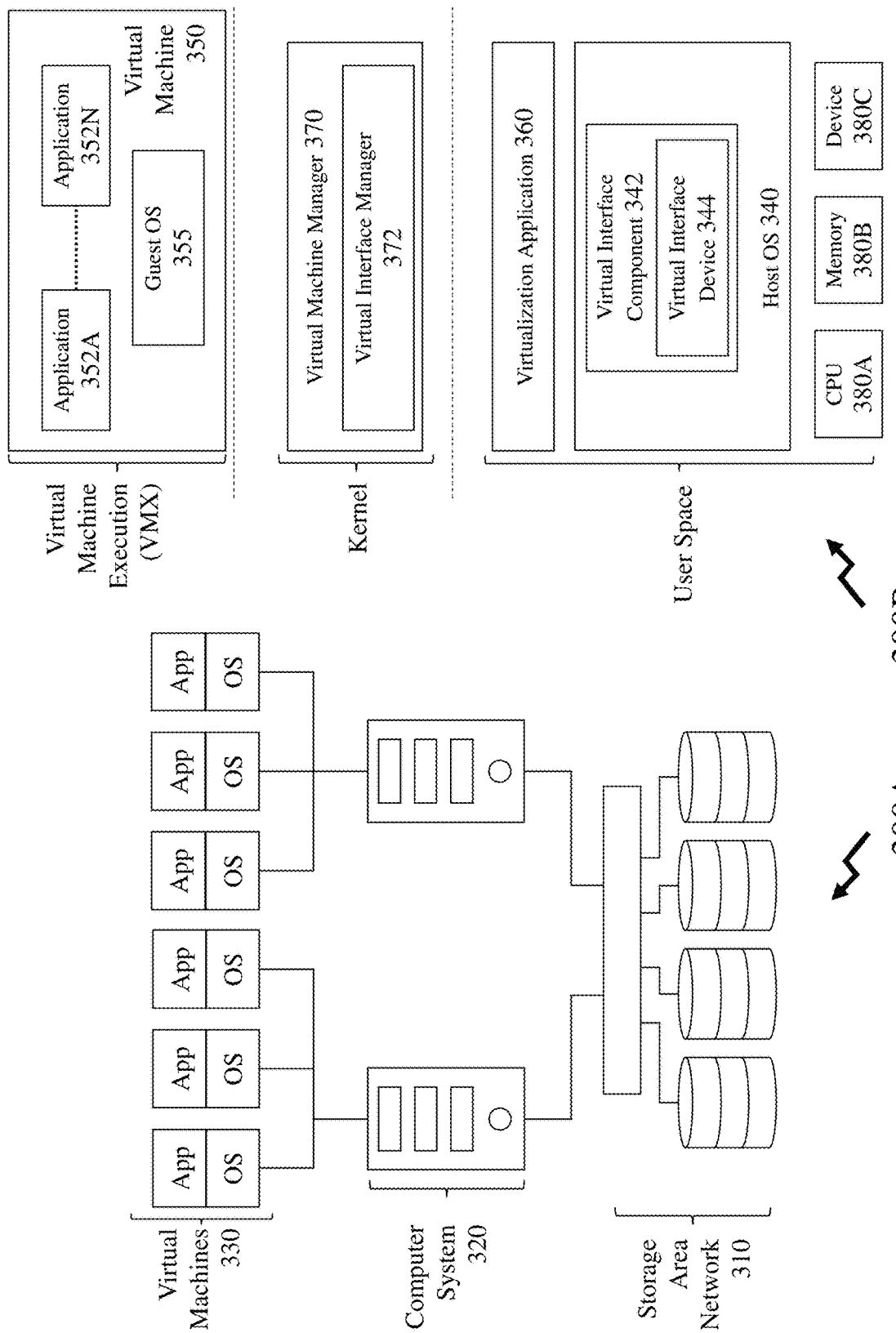
FIG. 3A depicts schematically an architecture of virtual machines as instantiated by remote access sessions supporting embodiments of the invention.
FIG. 3B depicts a high-level diagram of a computer system supporting exemplary virtual machine execution environments supporting one or more aspects and/or embodiments of the invention.

A remote access session may for example be an instance of a Virtual Machines 330 and 350 as described and depicted in FIGS. 3A and 3B respectively, is an instance of a user session or profile in execution upon the Remote Access System 230 which is accessed remotely at the Mobile Device 210 and/or Client Device 220 by a client application in execution upon the respective Mobile Device 210 and/or Client Device 220. The Mobile Device 210 and/or Client Device 220 connects to the Remote Access System 230 and initiates either a new remote access session or accesses an established remote access session either in execution or suspended pending user re-initiation. The remote access session allows the Mobile Device 210 and/or Client Device 220 to access resources of the Remote Access System 230 and therein those of the server(s) forming part of server or server system associated with the Remote Access System 230, such as volatile memory (e.g., random access memory), persistent memory (e.g., a hard drive), a processor (e.g., a central processing unit (CPU) or a graphics processing unit (GPU)), a component or components of an operating system, or an application or applications such as Applications 352A to 352N respectively as depicted in FIG. 3B. One or more of these resources may be physical resources that are accessed through the remote access session (e.g., through a terminal service) and are either directly accessible to the Remote Access System 230 or accessible to the Remote Access System 230 via the Network 102 or another network to which the Remote Access System 230 is also connected. For example, the Remote Access System 230 may be in execution upon a server which forms part of a server farm wherein the Remote Access System 230 can access resources upon or associated with the other servers in the server farm. One or more of these resources may be virtual resources that accessed through the remote access session (e.g., through remote desktop virtualization via a Virtual Machine). Optionally, the Remote Access System 230 may cause the Mobile Device 210 and/or Client Device 220 to connect to the remote access session, such that a user of the Mobile Device 210 and/or Client Device 220 may then use the remote access session to access the resources and/or applications of the server. Optionally, the user of the Mobile Device 210 and/or Client Device 220 may trigger the connection to the Remote Access System 230 to establish the remote access session so that the user of the Mobile Device 210 and/or Client Device 220 may then use the remote access session to access the resources and/or applications of the server.

Within embodiments of the invention the Mobile Device 210 and/or Client Device 220 may communicate with the Network 102 through a wireless connection, such as a terrestrial wireless communication system (e.g., a cellular data network or one or more Wi-Fi networks) or a satellite system for example. Alternatively, the Mobile Device 210 and/or Client Device 220 may communicate with the Network 102 through a wired connection, such as Ethernet or Internet over cable for example. Alternatively, the Mobile Device 210 and/or Client Device 220 may communicate with the Network 102 through a wireless connection such as depicted in FIG. 1 to a network access point (e.g. Access Point 106) and therein to the Network 102 via Network Device 107 or through a network access point directly to the Network 102.

A remote access session may be possible only within a predetermined geofence, e.g. a Mobile Device 210 associated with user of an enterprise can only successfully establish a remote access session if the Mobile Device 210 is within one or more geofences where each geofence is associated with a location of the enterprise and/or a residence of the user, for example. Similarly, Client Device 206 may be similarly geofenced such that movement of the Client Device 206 inside a geofence allows a remote access session to be established and movement of the Client Device 206 outside of the geofence prevents a remote session being established and/or terminates an existing remote session. The application(s) accessible to the user within a remote access session are determined by whether the Mobile Device 210 and/or Client Device 220 used by the user is within a geofence. A user may define the geofences themselves, e.g. their residence or set it to some default inaccessible geofence (e.g. one of zero radius or the North Pole for example) such that upon loss of the Mobile Device 210 and/or Client Device 220 access to application(s) and/or remote access sessions is prevented. The Mobile Device 210 and/or Client Device 220 may determine their location by one or more means including, but not limited to, accessing a global positioning system (GPS, such as GPS receiver 162 as depicted in FIG. 1), by triangulation with or proximity to signals from one or more antennas with known locations, such as cellular data network towers in a cellular data network or Wi-Fi devices in the Wi-Fi networks. Optionally, the Mobile Device 210 and/or Client Device 220 may establish its location by communicating with another device in its proximity, e.g. a Mobile Device 210 without a GPS may establish a personal area network connection to another device, e.g. a smartphone of the user, and therein obtain its location.

As depicted in FIG. 2 the Mobile Device 210 includes one or more Interfaces 218 to communicate with the Network 102, such as wireless interfaces to a cellular data network, a Wi-Fi network, and/or a satellite system, for example, or a wired interface to an Internet Router, for example. The Mobile Device 210 includes a Remote Access Manager Client 212 that communicates with an Operating System 214 of the Mobile Device 210, for example, to determine a location of the Mobile Device 210 or access one or more applications. an application in execution upon the Mobile Device 210 may trigger the Remote Access Manager Client 212 to access the Remote Access System 230. The Remote Access Manager Client 212 and Operating System 214 can each access Data Storage 216.

Similarly, as depicted in FIG. 2 the Client Device 220 includes one or more Interfaces 222 to communicate with the Network 102, such as wireless interfaces to a cellular data network, a Wi-Fi network, and/or a satellite system, for example, or a wired interface to an Internet Router, for example. The Client Device 220 includes a Remote Access Manager Client 224 that communicates with an Operating System 226 of the Client Device 220, for example, to determine a location of the Client Device 220 or access one or more applications. an application in execution upon the Client Device 220 may trigger the Remote Access Manager Client 224 to access the Remote Access System 230. The Remote Access Manager Client 224 and Operating System 226 can each access Data Storage 216 whilst the Remote Access Manager Client 224 may also access or communicate with Remote Access Client 225.

Similarly, as depicted in FIG. 2 the Remote Access System 230 includes one or more Interfaces 236 to communicate with the Network 102 and a Remote Access Manager 238 which communicates with Data Storage 232 that stores information that identifies or relates to a remote access session associated with the Mobile Device 210 and/or Client Device 220. As depicted the Remote Access Manager 238 communicates via Remote Access Commands 242 over Remote Access Connection 244 between its Interface 236 and Interface 236 of the Mobile Device 210. Similarly, the Remote Access Manager 238 communicates via Remote Access Commands 224 over Remote Access Connection 254 between its Interface 236 and Interface 222 of the Client Device 220. Accordingly, the Mobile Device 210 and/or Client Device 220 can send a remote access command to the Remote Access System 230 to initiate and/or connect to a remote access session or the Remote Access System can send a remote access command to Mobile Device 210 and/or Client Device 220 to initiate and/or connect to a remote access session.

As depicted in FIG. 2 the Remote Access System 230 in addition to the Remote Access Manager 238 and Data Storage 232 includes a Remote Access Server 234 which is hosted at a server that may include one or more computing devices. The server may be included in the Remote Access System 230 or be a system that is separate and/or distinct from the Remote Access System 230. The Remote Access Manager 238 may cause the Remote Access Server 234 to initiate a remote access session. Once connected, a user of the Mobile Device 210 may access resources provided by the server through the Remote Access Connection 244 to the remote access session or a user of the Client Device 220 may access resources provided by the server through the Remote Access Connection 254 to the remote access session.

Within some implementations, the Remote Access Manager Client 212 at the Mobile Device 210 and/or the Remote Access Manager Client 224 at the Client Device 220 receive an input from a user, device, and/or application that includes authentication information, such as a username, password, and/or one-time password. The Remote Access Manager Client 212 and/or the Remote Access Manager Client 224 may provide the authentication information to the Remote Access Manager 238. The Remote Access Manager 238 may condition the sending of the Remote Access Command 242 on having successfully verified authentication information received from the Mobile Device 210 or Remote Access Command 252 on having successfully verified authentication information received from the Client Device 220. This verification, being for example, against corresponding authentication information that is stored at the Remote Access System 230 in the Data Storage 232 or another memory accessible to the Remote Access System 230 (e.g., a username and/or password) and/or calculated by the Remote Access Manager 238 (e.g., a one-time password). In some implementations, the authentication information may include information from a scanner/device, such as biometric data from a biometric scanner and/or biometric device (e.g. a fingerprint, facial scanner, or credential data of the user from a card scanner and/or reader device (e.g. as employed for access control), associated with the Mobile Device 210 and/or Client Device 220 or a location such as a worksite, office, enterprise access point etc. The information provided to the Remote Access System 230 by the Mobile Device 210 and/or Client Device 220 retrieved from the scanner/device may also include information that identifies a user account associated with the successful verification of the user or is retrieved from another system in dependence upon the information retrieved from the scanner/device. This information may be provided as obtained or as processed by a system such as the user's electronic device, e.g. Mobile Device 210 or Client Device 220. This information provided to the Remote Access System 230 may also include information that identifies the scanner/device as well as time and/or date of the information being acquired and/or geographic location information of the scanner/device location. Such a verification providing an alternate means of restricting remote access sessions and/or application executable within a remote access session to geofencing.

In response to successfully verifying the received authentication information, the Remote Access Manager 238 may perform a transformation on the received authentication information and/or additional information, such as by creating a hash of the information, to generate a key. The Remote Access Manager 238 may provide the key to the Remote Access Manager Client 212 at the Mobile Device 210 and/or the Remote Access Manager Client 224 at the Client Device 220. The Remote Access Manager Client 212 may store the key in a Data Storage 216 at the Mobile Device 210. The Remote Access Manager Client 224 may store the key in a Data Storage 228 at the Client Device 220. Alternatively, the Remote Access Manager Client 212 and/or the Remote Access Manager Client 224 may perform a transformation on the authentication information and/or additional information to generate the key and store the key in the Data Storage 216 and/or the Data Storage 228, respectively. The Remote Access Manager Client 212 may provide the key and/or a reverse of the transformation of the key to the Remote Access System 230 for authentication of the Mobile Device 210 by the Remote Access System 230. The Remote Access Manager Client 224 may provide the key and/or a reverse of the transformation of the key to the Remote Access System 230 with subsequent checks for remote access commands for authentication of the Client Device 220 by the Remote Access System 230. The communications between the Mobile Device 210, the Remote Access System 230, and/or the Client Device 220 over the Network 102 may be encrypted.

The authentication information used for authenticating the Remote Access Manager Client 224 at the Client Device 220 with the Remote Access Manager 238 at the Remote Access System 230 may be the same authentication information that is used to authenticate the Remote Access Client 225 with the Remote Access Server 234 or alternatively it may be separate and/or distinct.

In response to the Remote Access Manager Client 224 receiving the Remote Access Command 254, the Remote Access Manager Client 224 may instruct the Remote Access Client 225 to connect to the remote access session provided by the Remote Access Server 234 in the background of a user profile for the Client Device 220. Optionally, a user interface of the Client Device 220 may be locked requiring the user to provide authentication information to the Client Device 220 to unlock the user interface for the user profile where the Remote Access Client 225 establishes the Remote Access Connection 244 to the remote access session. Similarly, Remote Access Manager Client 212 receiving the Remote Access Command 242, the Remote Access Manager Client 212 may connect to the remote access session provided by the Remote Access Server 234 in the background of a user profile for the Mobile Device 210. Optionally, a user interface of the Mobile Device 210 may be locked requiring the user to provide authentication information to the Mobile Device 210 to unlock the user interface for the user profile where the Remote Access Manager Client 212 establishes the Remote Access Connection 254 to the remote access session.

The Remote Access Manager 238 may send a command to the Remote Access Server 234 to disconnect from a remote access session, for example, once the Remote Access Manager 238 has verified that the Remote Access Server 234 has completed a remote access session or upon receiving a Remote Access Command 242 from Mobile Device 210 or Remote Access Command 254 from Client Device 220 to terminate a remote access session. the Remote Access Manager 238 and/or Remote Access Server 234 may receive a Remote Access Command 242 from Mobile Device 210 or Remote Access Command 254 from Client Device 220 to log-off a remote access session such that the associated Remote Access Connection 244 or 232 is terminated but the processing upon the Remote Access System 230 and/or Remote Access Server 234 is not terminated. Accordingly, a remote access session may be initiated to establish a process, e.g. a numerical simulation within a computer aided design application, where the connection is not required to be maintained until the user wishes to access the results of the process. Similarly, the Remote Access Manager 238 and/or Remote Access Server 234 may receive a Remote Access Command 242 from Mobile Device 210 or Remote Access Command 254 from Client Device 220 to suspend a remote access session such that the associated Remote Access Connection 244 or 232 is terminated and the processing upon the Remote Access System 230 and/or Remote Access Server 234 suspended pending subsequent re-initiation of the remote access session.

Referring to FIG. 3A there is depicted a schematic architecture 300A supporting embodiments of the invention. As depicted a plurality of virtual machines (VMs) 130 are associated with a plurality of Computer Systems 320 which are themselves associated with a storage area network (SAN) 310. The plurality of Computer Systems 320 may be directly connected or indirectly connected via one or more communications networks to the 310, such as Network 102 in FIGS. 1 and 2. Accordingly, each VM 130 may employ virtual memory pages which are mapped to physical memory pages upon the 310. A Computer System 320 may be connected to one or more SANs 110. Whilst the descriptions in respect of FIGS. 3A to 3B are described with respect to a Computer System 320 hosting one or more VMs 330 it would be evident that these may be supported by a PED, a FED, a WED, a server, or a WES directly or indirectly through communications within one of the plurality of Computer Systems 320. A computer system 320 may itself be a PED, a FED, a WED, a server, or a WES. Accordingly, a computer system 320 may, as depicted in FIG. 3B, support a virtual machine execution (VMX) environment as a host system directly or indirectly or it may include a virtual machine monitor (VMM) facilitating execution of one or more VMs, each of which may, as depicted in FIG. 3B, run a guest operating system (OS) 355 to manage one or more Guest Applications 352A to 352N, respectively. Accordingly, a Computer System 320 may be a Remote Access System 230 and SAN 310 may be Data Storage 232 as depicted in FIG. 2. In this manner, a remote session established by a user may support one or more VMs 330 and therein a guess OS 355 and one or more Guest Applications 352A to 352N as depicted in FIG. 3B.

FIG. 3B depicts a high-level diagram of a computer system (host system) 300B supporting exemplary VMX environments supporting one or more aspects and/or embodiments of the present disclosure. The Host System 300B, e.g. Computer System 320 in FIG. 3A or Remote Access System 230 in FIG. 2, may include one or more central processing units (CPU) 380A communicatively coupled to one or more memory devices 380B and one or more peripheral devices 380C via a system bus, not depicted for clarity. The Host System 300B may implement a virtual execution environment for executing the software developed for a platform that is different from the native platform of the Host System 300B. In certain implementations, the virtual execution environment may be implemented using certain hardware-assisted virtualization features of the CPU 180A, which may support executing, at an elevated privilege level one or more elements, including but not limited to, a VMM 370 that manages one or more VMs. In various implementations, the VMM 370 may be implemented as a kernel module, a kernel extension, a driver, or a part of the Host Operating System (OS) 340. The Host OS 340 may further include a virtual interface component 142 which virtualizes a virtual interface component 142 to manage one or more Virtual Interface Devices 344 for use by the VM 350 and/or Host OS 340.

The VMM 370 may present a VM 350 with an abstraction of one or more virtual processors, while retaining selective control of processor resources, physical memory, interrupt management, and input/output (I/O). The VMM 370 may also present a VM 350 with an abstraction of one or more Virtual Interface Devices 344 of the Virtual Interface Component 342. A VM 350 may implement a software environment which may be represented by a stack including a Guest OS 355 and one or more applications 155A-155N. Each VM 350 may operate independently of other VMs and use the VMM-facilitated interface to the processors, memory, storage, graphics, and I/O provided by the Host System 300B. The VMM 370 may include a Virtual Interface Manager 372 to receive instructions to create a communication channel between a Host OS 340 and a Guest OS 355. The Virtual Interface Manager 372 may also send a request to Host OS 340 to create a Virtual Interface Device 344 and provide the Virtual Interface Device 144 to Guest OS 355. In considering VMX operation then there are two kinds of VMX operation commonly referred to, namely VMX root operation and VMX non-root operation. In general, a VMM, such as VMM 370 in FIG. 3B, will run in VMX root operation and guest software, such as Guest OS 355 and Applications 352A to 352N will run in VMX non-root operation. Transitions between VMX root operation and VMX non-root operation are called VMX transitions. There are two kinds of VMX transitions, those into VMX non-root operation from VMX operation are called VM entries whilst those from VMX non-root operation to VMX root operation are called VM exits.

Accordingly, a user may, for example, remotely access from either their PED, e.g. Mobile Device 210 in FIG. 2, and/or FED, e.g. Client Device 220 in FIG. 2, applications upon a remote system, e.g. Remote Access System 230 in FIG. 2, wherein a remote session they establish instantiates one or more instances of a Virtual Machine, such as Virtual Machine (VM) 350 in FIG. 3, to execute the application(s) the user wishes to execute. By virtue of exploiting VMs 350 then the operating system for these applications may be different from or the same as that of the operating system of the user's electronic device. Accordingly, the VM 350 operating system, Guest OS 355, for each VM 350 instantiated may be established as one of Linux, Windows, Android, and iOS, for example, which may be the same as or different to the operating system of the user's device, e.g. Mobile Device 210 or Client Device 220.

Remote sessions provide users with an ability to work with a discrete application, multiple applications, or whole desktops where these applications, desktops etc. are hosted on a remote system and provided through a remote session or sessions. These users may also, either discretely or concurrently, employ local applications on a local device (commonly referred to as a client device). Accordingly, from the user's perspective it is important for remote applications to behave as close to the local applications as possible to provide users with a seamless experience when they work within a mixed environment, i.e. one with remote applications and local applications.

Amongst the aspects of local applications upon a user's client device is the ability for the user to exploit multiple monitors such that different applications can be concurrently displayed upon different monitors thereby providing the user with improved visual usability as each application can be sized to the user's requirements without having to be concerned with displaying the concurrent applications within the constraints of a single monitor. Accordingly, it would be beneficial to provide users with a similar ability to exploit multiple monitors within a single remote session.

However, the inventors have also considered that it would be beneficial to extend this such that a user can exploit multiple client devices within a single remote session such that whilst the remote session is established upon a user's portable electronic device, for example, they can also exploit the keyboard, mouse, and monitor of their fixed electronic device for all or part of the session. Accordingly, the inventors have established methodologies to support multiple client devices within a single remote session for a single user or by logical extension to multiple users across these multiple client devices.

Embodiments of the invention provide one or more users with an ability to work with multiple remote applications running within a remote session through imitation of a single remote session with multiple client devices. Embodiments of the invention may convert any capable client device into a monitor for a main client device. Embodiments of the invention may convert any capable client device to a user interface for a main client device. Through wireless and/or network connections the multiple client devices can be employed by the main client device without requirements for wired interfaces between the main client device and the client devices.

Embodiments of the invention address several limitations within the prior art including, but not limited to:
 Inability to share session resources, e.g. files, clipboard, audiovisual elements, input/output interfaces, etc., of multiple devices within a single remote session;
 Attaching a client device (e.g. a television) capable of a video streaming to a main client device and using it within a remote session leads to offset high central processor unit (CPU) power consumption and local network bandwidth requirements from casting a video stream from a main client device to another client device;
 Hardware and software limitations when using external wireless monitors with client devices;
 Portable electronic devices have no solution that allows them to work as external monitors for desktop client devices.

Within embodiments of the invention a plurality of client devices are orchestrated to provide or cooperate to provide workspace environment to one or more users. Each client device may provide a user input interface, e.g. keyboard, touchscreen, mouse, etc. and/or a user output device, e.g. a display, audio output, etc. For example, multiple client devices each representing a single or multiple monitors (displays) may render content to a user or set of users for a single remote desktop session. The plurality of client devices connect to an orchestrating (or proxy) client device, referred to herein as a main client device. This orchestrating main client device connects to a remote session host and establishes the session for multiple monitors, for example, with resolutions equal to corresponding resolutions of each client device within the plurality of client device. Once a remote session is created and content for the remote session is being sent to the orchestrating client device it brokers portions of data from the virtual monitors in the remote session to each of the corresponding client devices within the plurality of client devices.

Within embodiments of the invention each client device is responsible for decoding the data from the main client device (received from the remote server) and rendering the content from the remote session host. Optionally, each client device or only the main client device can control the remote desktop session by sending commands, e.g. move a window, mouse/keyboard/touch events, etc. These commands can control the applications running in the sessions and rendered on a local or remote client device. Within the following descriptions in respect of FIGS. 4 to 12 the following terminology is employed:
 Client Device—a device, e.g. a PED or FED, a user accesses directly;
 Main client device—a primary device, e.g. a PED or FED, which communicates with a remote session host (e.g. remote server) and brokers communications between the remote session host and the one or more other client devices;
 Client Application—a software application running on a client device enabling access to the remote session host and therein the remote sessions and applications;
 Remote Session Host—a server responsible for running remote sessions for users and accepting remote access connections to these remote sessions; and
 Virtual monitor—a software imitation of a physical monitor on a client device wherein content sent to the virtual monitor can be processed locally or sent to another client device.

Figure 4A:
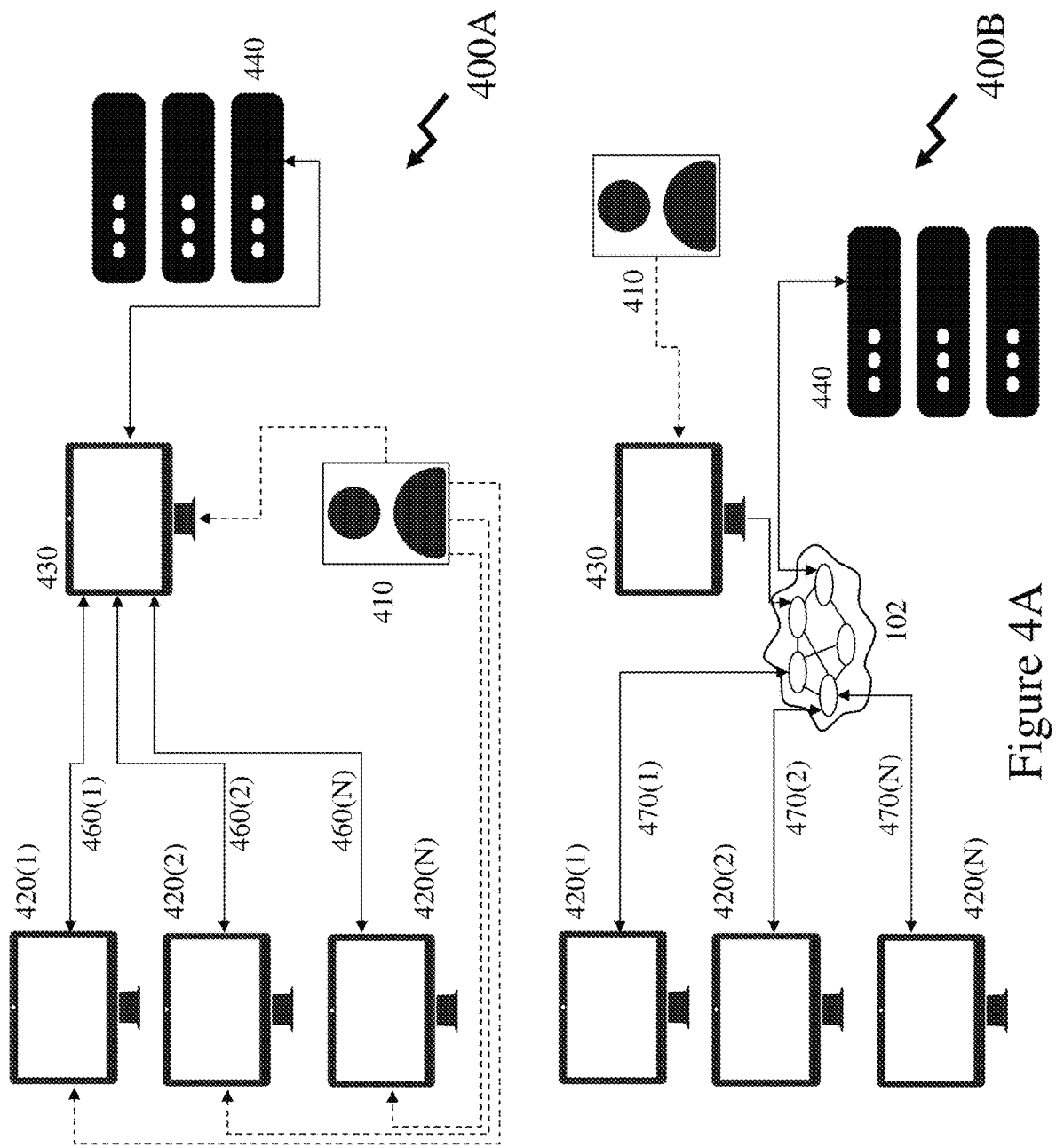

Referring to FIG. 4A there are depicted first and second exemplary configurations 400A and 400B respectively for configuring multiple client devices in conjunction with a main client device to orchestrate a remote session from a remote server according to embodiments of the invention. Referring initially to first Configuration 400A a User 410 employs an Orchestrating Client Device 430 to establish a remote session with a Remote Server 440. The Orchestrating Client Device 430 also communicates with first to N$^{th}$ Client Devices 420(1) to 420(N) respectively which render the remote session contents to the User 410. As will be evident from the discussion above and below with respect to FIGS. 5 to 12 respectively the first to N$^{th}$ Client Devices 420(1) to 420(N) respectively each render a portion of the remote session established between the Orchestrating Client Device 430 and Remote Server 440. Within first Configuration 400A the first to N$^{th}$ Client Devices 420(1) to 420(N) respectively are coupled to the Orchestrating Client Device 430 via wired and/or wireless links 460(1) to 460(N) respectively.

As depicted the user interacts with Orchestrating Client Device 430 wherein first to N$^{th}$ Client Devices 420(1) to 420(N) respectively are computer monitors (displays) which may or may not include touch sensitive displays allowing the user to enter commands, enter content, move application windows, open applications, close applications etc. within the remote session. Optionally, within embodiments of the invention the Orchestrating Client Device 430 may in addition to orchestrating the first to N$^{th}$ Client Devices 420(1) to 420(N) respectively, e.g. for rendering audiovisual content, receiving input commands, providing output commands, etc., also be one of the first to N$^{th}$ Client Devices 420(1) to 420(N) such that the User 410A may employ the Orchestrating Client Device 430 as the one of the first to N$^{th}$ Client Devices 420(1) to 420(N).

Referring to second Configuration 400B a User 410 employs an Orchestrating Client Device 430 to establish a remote session with a Remote Server 440. The Orchestrating Client Device 430 also communicates with first to N$^{th}$ Client Devices 420(1) to 420(N) respectively which render the remote session contents to the User 410. As will be evident from the discussion above and below with respect to FIGS. 5 to 12 respectively the first to N$^{th}$ Client Devices 420(1) to 420(N) respectively each render a portion of the remote session established between the Orchestrating Client Device 430 and Remote Server 440. Within second Configuration 400B the first to N$^{th}$ Client Devices 420(1) to 420(N) respectively are coupled to the Orchestrating Client Device 430 via Network 102 over network connections 470(1) to 470(N) respectively.

As depicted the user interacts with Orchestrating Client Device 430 wherein first to N$^{th}$ Client Devices 420(1) to 420(N) respectively are computer monitors (displays) which may or may not include touch sensitive displays allowing the user to enter commands, enter content, move application windows, open applications, close applications etc. within the remote session. Optionally, within embodiments of the invention the Orchestrating Client Device 430 may in addition to orchestrating the first to N$^{th}$ Client Devices 420(1) to 420(N) respectively, e.g. for rendering audiovisual content, receiving input commands, providing output commands, etc., also be one of the first to N$^{th}$ Client Devices 420(1) to 420(N) such that the User 410A may employ the Orchestrating Client Device 430 as the one of the first to N$^{th}$ Client Devices 420(1) to 420(N).

Figure 4B:
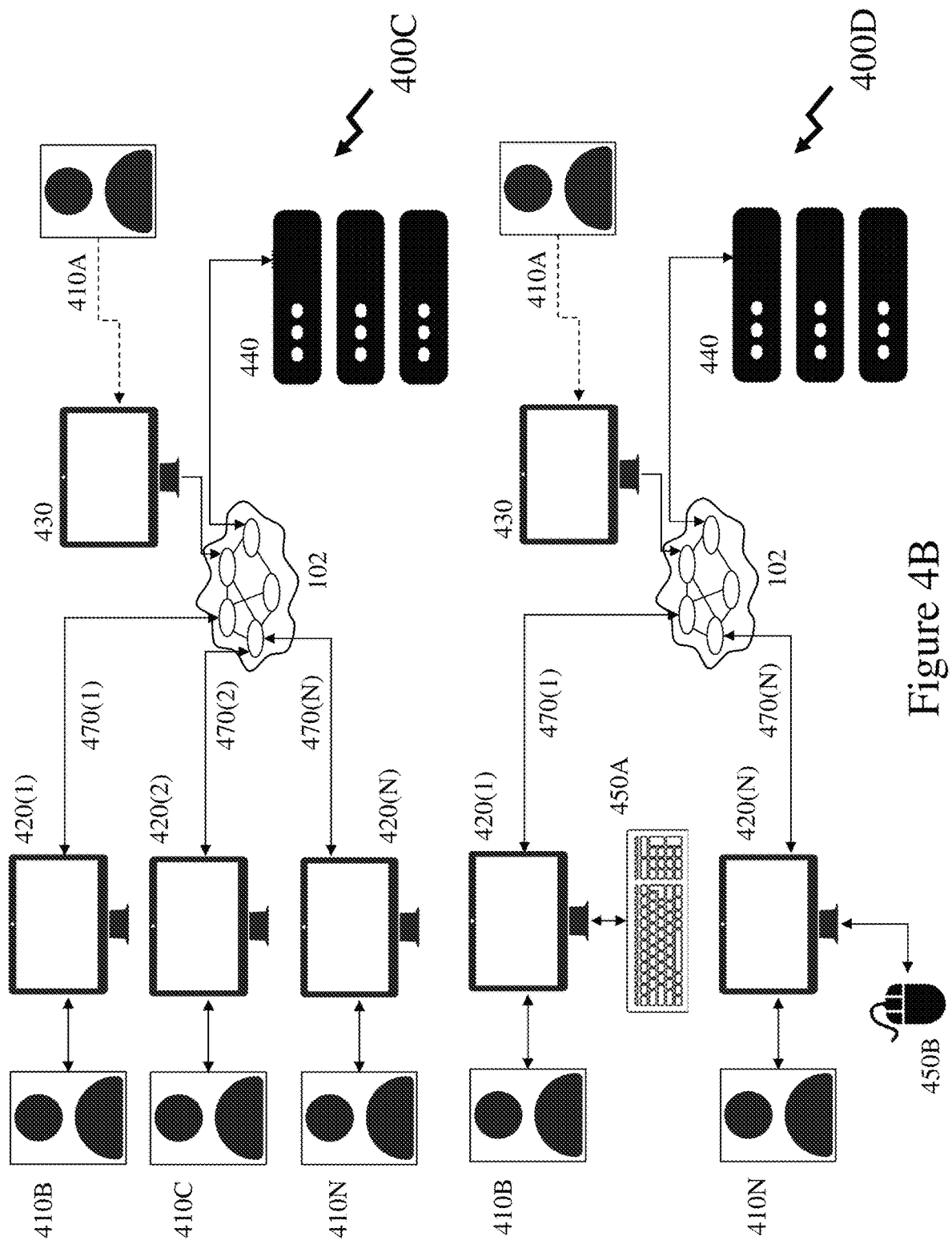

Referring to FIG. 4B there are depicted third and fourth exemplary configurations 400C and 400D respectively for configuring multiple client devices in conjunction with a main client device to orchestrate a remote session from a remote server according to embodiments of the invention. Referring initially to third Configuration 400C a first User 410A employs an Orchestrating Client Device 430 to establish a remote session with a Remote Server 440. The Orchestrating Client Device 430 also communicates with first to N$^{th}$ Client Devices 420(1) to 420(N) respectively which render the remote session contents to the second to N$^{th}$ users 410B to 410N, respectively.

With respect to first to fourth exemplary configurations 400A to 400D respectively and the follow descriptions with respect to FIGS. 5 to 11 respectively, the embodiments of the invention are described and depicted from a perspective wherein a user is employing multiple devices within a single session with an emphasis on the displays associated with these devices, namely the client devices. However, it would be evident to one of skill in the art that each client device within a client session may provide the user with access to one or more elements of each client device which may or may not include the display. Further, within other embodiments of the invention a client device may be a sensor, a wearable device, or other electronic device which is either in communication with the Orchestrating Client Device 430 directly such as depicted in first Configuration 400A in FIG. 4A or via one or more networks such as depicted in second to fourth configurations 400B to 400D respectively and may therefore not comprise a display in many instances.

Such elements of a client device may include, but not be limited to, a peripheral device such as a mouse, keyboard, stylus, tablet, an input interface, an output interface, etc. Such elements of a client device may include, but not be limited to, a peripheral device such as an external hard disk drive (HDD), CD or DVD drive; audio speakers, a printer, a scanner, computer controlled equipment, robotic system, etc. Such elements of a client device may include, but not be limited to, a disk drive, a keyboard, a touchpad, etc.

Accordingly, for example client devices associated with a single session may provide additional functionalities and/or capabilities to the user. For example, the user may play audio content upon audio speakers of another client device, may print documents to a remote printer (e.g. their printer at home or work), or use an input device such as a Wacom tablet for example connected to client device.

Examples of such configurations being presented within FIG. 4C with fifth and sixth exemplary configurations 400E and 400F, respectively. Referring to fifth Configuration 400E the Orchestrating Client Device 430 is depicted in a similar configuration as first Configuration 400A wherein it is directly in communication the first to N$^{th}$ Client Devices 480(1) to 480(N) respectively. As depicted, these comprise Smart Watch, FED, and Server (or desktop FED without monitor) respectively. Associated with second Client Device 480(2), either through wired or wireless links for example, are External HDD 4010 and Printer 4020. Associated with the N$^{th}$ Client Device 480(N) are Keyboard 4030 and Mouse 4040. Accordingly, the User 410 may utilize each of External HDD, 4010, Printer 4020, Keyboard 4030 and Mouse 4040 within a single session or alternatively access different combinations within different sessions either concurrently or at different times. Optionally, Client Device 480(2) may be a PED.

Referring to sixth Configuration 400F the Orchestrating Client Device 430 is depicted in a similar configuration as second to fourth Configurations 400B to 400D wherein it is in communication with first to N$^{th}$ Client Devices 490(1) to 490(N) respectively via Network 102. As depicted first and N$^{th}$ Client Devices 490(1) and 490(N) being FEDs (or PEDs) whilst Second Client Device 490(2) is a router. Associated with first Client Device 490(1) is a Camera 4050, either through a wired or wireless link for example. Associated with second Client Device 490(2) is an Additive Manufacturing System 4060 (commonly referred to as a 3D Printer), either through a wired or wireless link for example. Associated with N$^{th}$ Client Device 490(N) are Keyboard 4070 and Mouse 4080, either through wired or wireless links for example. Accordingly, the User 410 may utilize Camera 4050, Additive Manufacturing System 4060, Keyboard 4070, and Mouse 4080 within a single session or alternatively access different combinations within different sessions either concurrently or at different times.

As will be evident from the discussion above and below with respect to FIGS. 5 to 11 respectively the first to N$^{th}$ Client Devices 420(1) to 420(N) respectively each render a portion of the remote session established between the Orchestrating Client Device 430 and Remote Server 440. Optionally, within embodiments of the invention the Orchestrating Client Device 430 may in addition to orchestrating the first to $N^{th}$ Client Devices 420(1) to 420(N) respectively, e.g. for rendering audiovisual content, receiving input commands, providing output commands, etc., also be one of the first to $N^{th}$ Client Devices 420(1) to 420(N) such that the User 410A may employ the Orchestrating Client Device 430 as the one of the first to $N^{th}$ Client Devices 420(1) to 420(N).

Within third Configuration 400C the first to $N^{th}$ Client Devices 420(1) to 420(N) respectively are coupled to the Orchestrating Client Device 430 via Network 102 over network connections 470(1) to 470(N) respectively. Optionally, first User 410A and second to $N^{th}$ users 410B to 410N respectively may all be different users. Optionally, first User 410A and second User 410B may be same user whilst third to $N^{th}$ users 410C to 410N may be all be different users. Optionally, first User 410A and second User 410B may be same user whilst third to $N^{th}$ users 410C to 410N may be another user.

As depicted the user interacts with Orchestrating Client Device 430 wherein first to $N^{th}$ Client Devices 420(1) to 420(N) respectively are computer monitors (displays) which may or may not include touch sensitive displays allowing the user to enter commands, enter content, move application windows, open applications, close applications etc. within the remote session. Optionally, within embodiments of the invention the Orchestrating Client Device 430 may in addition to orchestrating the first to $N^{th}$ Client Devices 420(1) to 420(N) respectively, e.g. for rendering audiovisual content, receiving input commands, providing output commands, etc., also be one of the first to $N^{th}$ Client Devices 420(1) to 420(N) such that the User 410A may employ the Orchestrating Client Device 430 as the one of the first to $N^{th}$ Client Devices 420(1) to 420(N).

Now referring to fourth Configuration 400D a first User 410A employs an Orchestrating Client Device 430 to establish a remote session with a Remote Server 440. The Orchestrating Client Device 430 also communicates with first and $N^{th}$ Client Devices 420(1) to 420(N) respectively which render the remote session contents to the second to $N^{th}$ users 410B to 410N, respectively. As depicted second Client Device 420(1) has associated with it first User Interface 450A, depicted as a keyboard. $N^{th}$ client 420(N) has associated with it second User Interface 450B, depicted as a mouse. Accordingly, second User 410B may view content forming part of the remote session and provide input via first User Interface 450A where first Client Device 420(1) is a computer monitor without touch screen capabilities. $N^{th}$ User 410N views content forming part of the remote session and provides input via second User Interface 450N as well as through $N^{th}$ Client Device 420(N) which has touch screen capabilities. Accordingly, each client device of the first and $N^{th}$ Client Devices 420(1) to 420(N) respectively may have associated with it one or more peripheral input/output devices including, for example, keyboard, mouse, tablet, stylus, etc. Within other embodiments of the invention each device associated with first and $N^{th}$ Client Devices 420(1) to 420(N) respectively may be a PED, a FED, a sensor, a wearable device, etc. Optionally, first User 410A and second User 410B may be the same user so that the user may employ Orchestrating Client Device 430 and first Client Device 420(1) with first User Interface 450A. Optionally, first User 410A and $N^{th}$ User 410N may be the same user so that the user may employ Orchestrating Client Device 430 and $N^{th}$ Client Device 420(N) with second User Interface 450B.

Optionally, within an embodiment of the invention the Orchestrating Client Device, e.g. Main Device 430, may receive all input commands and/or data from first and $N^{th}$ Client Devices 420(1) to 420(N) respectively which it parses and then transmits to the remote server, but the Orchestrating Client Device does not receive the combined data (stream) for rendering on the first and $N^{th}$ Client Devices 420(1) to 420(N) respectively. This being transmitted directly from the Remote Server 440 to the first and $N^{th}$ Client Devices 420(1) to 420(N) respectively.

Figure 5:
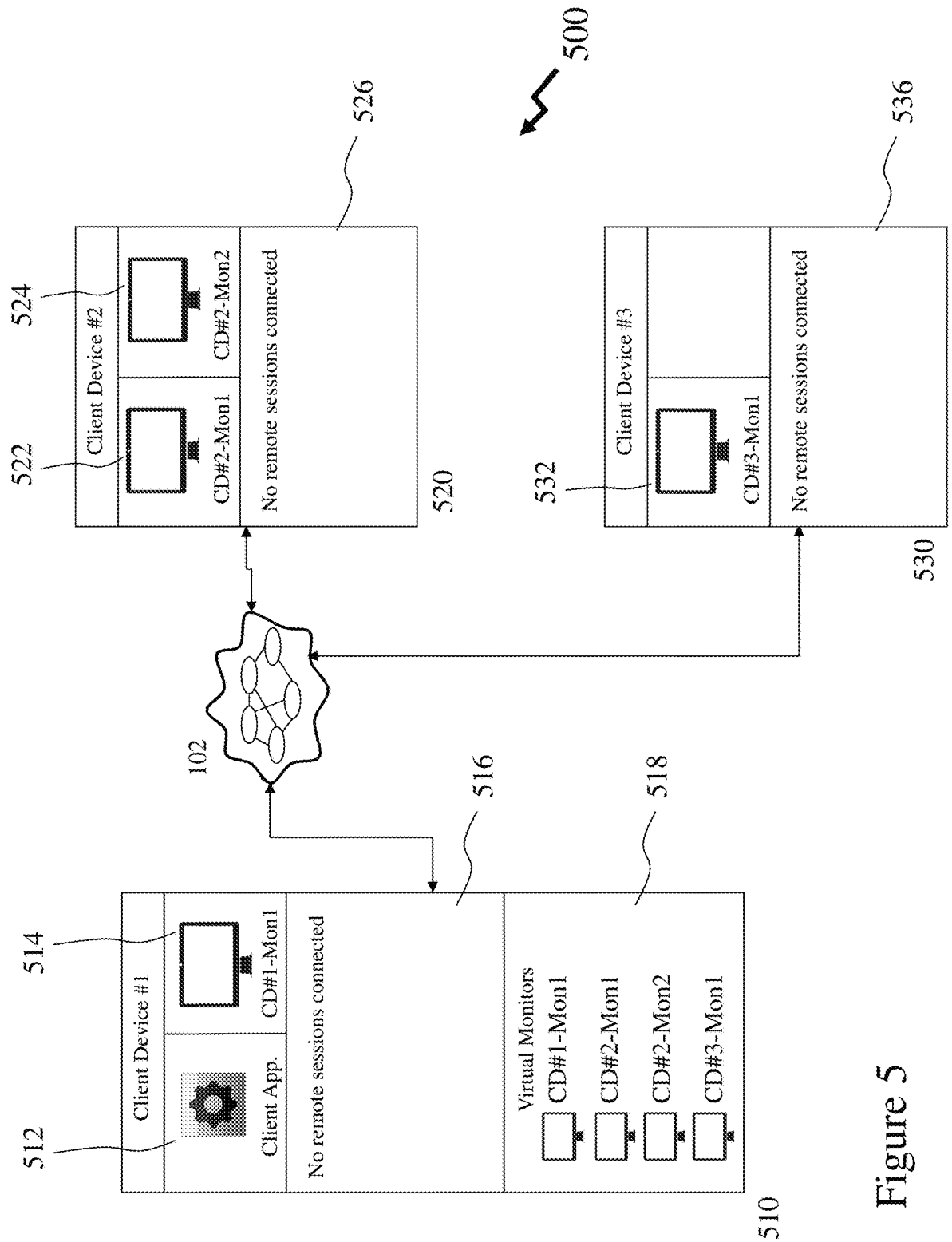
FIG. 5 depicts an exemplary configuration for a main client device orchestrating multiple client devices acting as a proxy remote session host with a remote server prior to establishing a remote session according to an embodiment of the invention.

Now referring to FIG. 5 there is depicted an exemplary Configuration 500 for a main client device, Client Device #1 510, orchestrating multiple client devices, Client Device #520, and Client Device #3 530, which are coupled to the Client Device #1 510 via Network 102. The main client device, Client Device #1 510, acts as a proxy remote session host with a remote server, not shown for clarity, prior to establishing a remote session according to an embodiment of the invention with the remote server.

Accordingly, as depicted Client Device #1 510 comprises a Client Application 512, a first Monitor (CD #1-Mon1) 514, Session List 516, and Virtual Monitor List 518 comprising monitors associated with the Client Device #1. These being, first Monitor (CD #1-Mon1) 514, a pair of monitors associated with Client Device #2 520 (identified as CD #2-Mon1 and CD #2-Mon2) and a monitor associated with Client Device #3 530 (identified as CD #3-Mon1). As within the configuration 500 no remote sessions have been established Session List 516 indicates this status.

Client Device #2 520 comprises identification of the pair of monitors associated with Client Device #2 520 which are identified as CD #2-Mon1 522 and CD #2-Mon2 524, respectively. As within configuration 500 no remote session has been established with Client Device #2 520 then Session List #2 526 indicates this status. Similarly, Client Device #3 530 comprises identification of the monitor associated with Client Device #3 530, identified as CD #3-Mon1 532. As within configuration 500 no remote session has been established with Client Device #3 530 then Session List #3 536 indicates this status.

It would be evident that within embodiments of the invention each of Client Device #2 520 and Client Device #3 530 may each have a software application, not depicted for clarity, associated with them which supports communications with Client Application 512 so that aspects of the remote session which are orchestrated by Client Device #1 510 for Client Device #2 520 and Client Device #3 530 are established discretely from other applications and/or remote sessions upon each of the Client Device #2 520 and Client Device #3 530.

Optionally, within embodiments of the invention, a software application, not depicted for clarity, may also be associated with Client Device #1 510 which communicates with Client Application 512. This software application may orchestrate communications with Client Device #2 520 and Client Device #3 530 whilst Client Application 512 manages the remote session with the remote server/system.

Figure 6A:
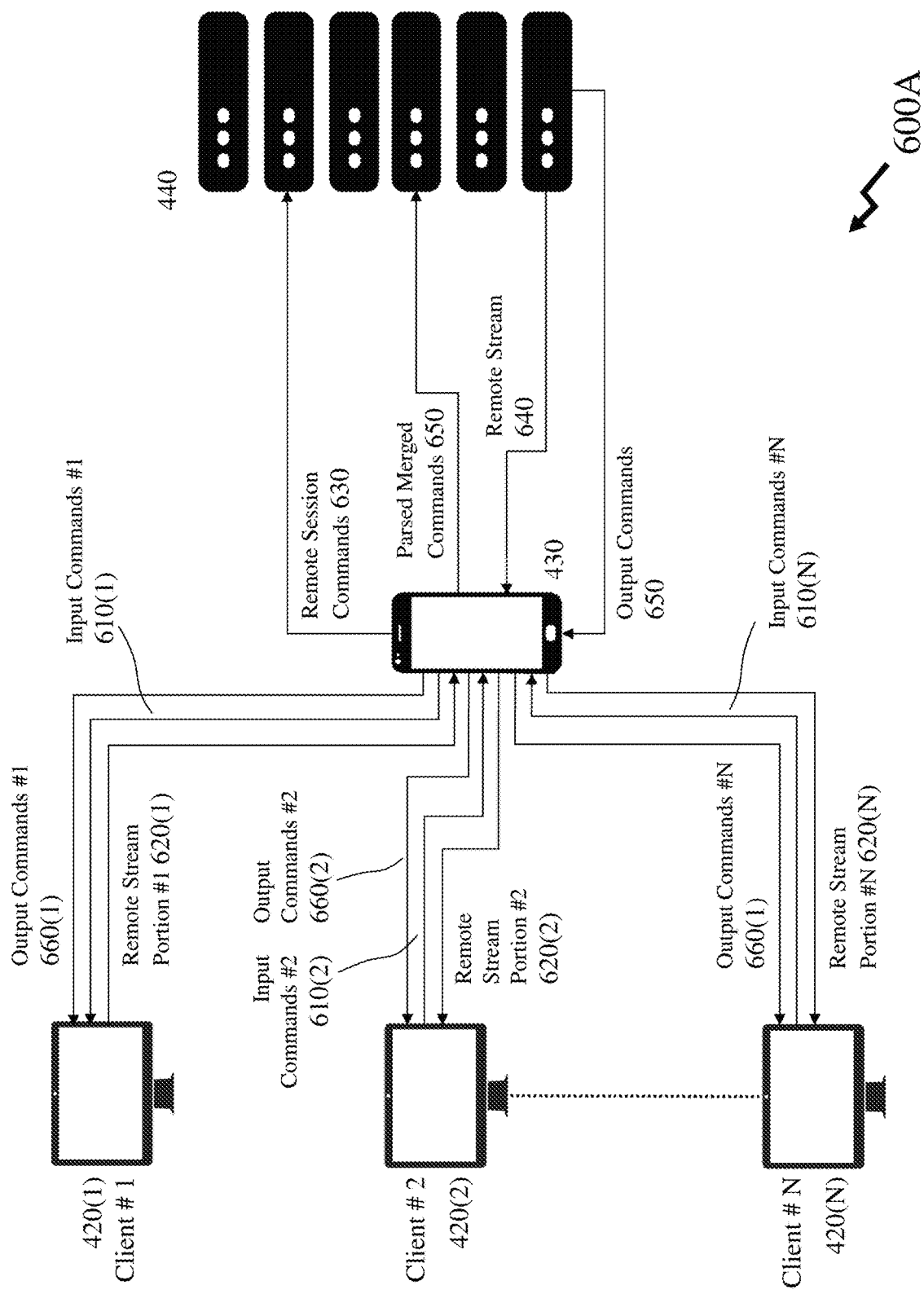
FIGS. 6A and 6B depict exemplary messaging flows for a main client device orchestrating multiple client devices acting as a proxy remote session host with a remote server such as depicted in FIG. 5 according to an embodiment of the invention.
Figure 6B:
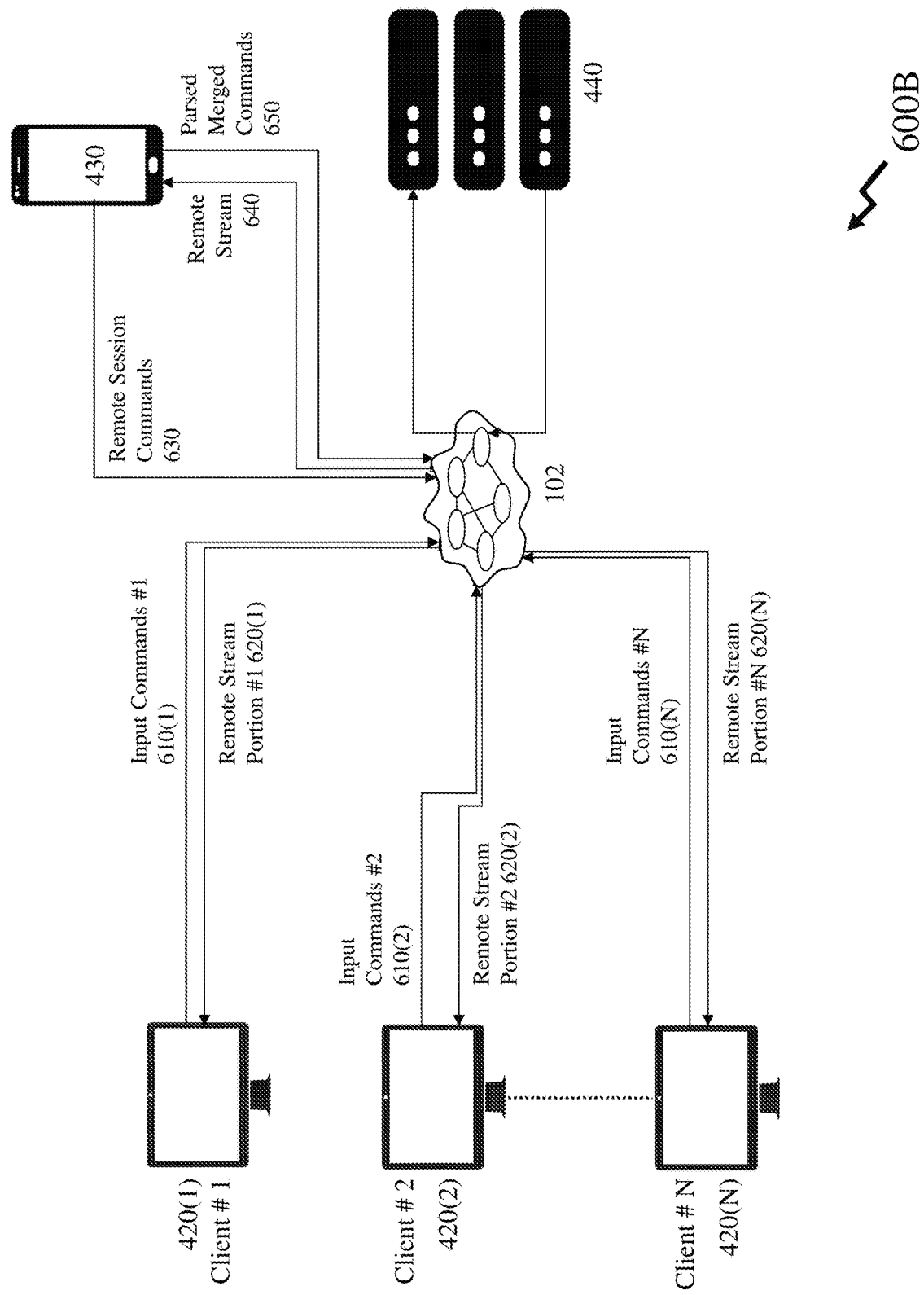

Optionally, within embodiments of the invention, the software applications in execution upon the client devices, e.g. Client Device #2 520 and Client Device #3 530, within a configuration such as described and depicted within fourth Configuration 400D in FIG. 4B and FIG. 6B may support a remote session directly with the remote server. These remote sessions being established in dependence upon the Orchestrating Client Device 430 establishing an initial remote session with the Remote Server 440 which includes the identities of Client Device #2 and Client Device #3 530.

Referring to FIGS. 6A and 6B there are depicted exemplary first and second Messaging Flows 600A and 600B respectively for a main client device orchestrating multiple client devices acting as a proxy remote session host with a remote server such as depicted in FIG. 5 according to embodiments of the invention. Referring to first Messaging Flow 600A in FIG. 6A there are depicted first to $N^{th}$ Client Devices 420(1) to 420(N) respectively which are coupled to Orchestrating Client Device 430. The Orchestrating Client Device 430 being coupled to Remote Server 440. Orchestrating Client Device 430 sends Remote Session Commands 630 in order to establish a remote session upon the Remote Server 440. These Remote Session Commands 630 resulting in the establishment of the remote session wherein the Remote Server 440 provides content for rendering through Remote Stream 640 to the Orchestrating Client Device 430. As the Orchestrating Client Device 430, e.g. Client Device #1 510 in FIG. 5, has the configuration of other devices, first to $N^{th}$ Client Devices 420(1) to 420(N) respectively (for example Client Device #2 520 and Client Device #3 530 in FIG. 5) then the Orchestrating Client Device 430 can parse the Remote Stream 640 to provide:

the content for the Orchestrating Client Device 430 to be rendered as part of the remote session;

Remote Stream Portion #1 620(1) to first Client Device #1 420(1);

Remote Stream Portion #2 620(2) to second Client Device #1 420(2); through to Remote Stream Portion #N 620(N) to $N^{th}$ Client Device #1 420(N).

Each portion remote stream portion 620(1) to 620(N), being rendered upon the appropriate client device to the user(s) associated with the client devices. With reference to FIG. 5 Client Device #2 520 has associated with it a pair of monitors, CD #2-Mon1 522 and CD #2-Mon2 524. Accordingly, with an embodiment of the invention Client Device #2 520 receives the remote stream for both CD #2-Mon1 522 and CD #2-Mon2 524 and displays this configuration data within the remote stream(s) provided to it such that the client device renders the remote streams upon the pair of displays using techniques as known in the prior art for rendering content upon displays associated with the same processor, i.e. the same client device Client Device #2 520.

Within other embodiments of the invention the pair of monitors associated with Client Device #2 520 are treated by the system as independent. Accordingly, Client Device #2 520 receives two streams, for example, Remote Stream Portion #N-1 620(N-1) and Remote Stream Portion #N 620(N). A software application installed upon Client Device #2 520, either previously or as a result of the establishment of the remote session, receives both streams and directs these to the appropriate displays of Client Device #2 520. Accordingly, the standard system features of the client device for managing rendering to multiple displays are bypassed through the software application.

Also depicted in first Messaging Flow 600A are command flows from each of the first to $N^{th}$ Client Devices 420(1) to 420(N) respectively. These being depicted as Input Commands #1 to Input Commands #N 620(1) to 620(N) respectively which are coupled to Orchestrating Client Device 430. These command streams Input Commands #1 to Input Commands #N 620(1) to 620(N) respectively being parsed by the Orchestrating Client Device 430 thereby generating Remote Session Commands 630 which are provided to the Remote Server 440. The Remote Server 440 thereby processing the Remote Session Commands 630 and generating Remote Stream 640.

Also depicted in first Messaging Flow 600A in FIG. 6A are Output Commands 650 from the Remote Server 440 to the Orchestrating Client Device 430 which are parsed by the Orchestrating Client Device 430 and communicated to the appropriate one or more of the first to $N^{th}$ Client Devices 420(1) to 420(N) respectively. These parsed output commands being depicted as Output Command #1 to Output Commands #N 660(1) to 660(N) respectively. Such Output Commands 650 and associated output command streams Output Command #1 to Output Commands #N 660(1) to 660(N) respectively may be associated with aspects of the remote session other than providing content to be rendered to the user. Such aspects may include, but not be limited to, content, data, control settings or other data to be communicated to one of the first to $N^{th}$ Client Devices 420(1) to 420(N) respectively, a peripheral associated with one of the first to $N^{th}$ Client Devices 420(1) to 420(N) respectively, or another device associated with one of the first to first to $N^{th}$ Client Devices 420(1) to 420(N) respectively. This may include, but not be limited to, content to be printed upon a printer, audio content to be played upon audio speakers, data for a 3D printer, data to be stored within a memory (e.g. an HDD internal or external to a client device), data to a haptic interface.

Optionally, other output commands may be generated by one or more of the first to $N^{th}$ Client Devices 420(1) to 420(N) respectively but rather than be transmitted to the Remote Server 440, returned as part of Output Commands 650, and parsed to the appropriate one or more of the first to $N^{th}$ Client Devices 420(1) to 420(N) respectively the Orchestrating Client Device 430 may route these commands directly as the Orchestrating Client Device 430 may store, in addition to the Virtual Monitor List 518 as depicted in FIG. 5, additional data relating to other devices, peripherals etc. associated with the first to $N^{th}$ Client Devices 420(1) to 420(N) respectively. This information may be retrieved by the Orchestrating Client Device 430 from the other client devices based upon configuration data stored by each client device within session configuration files.

These command streams Input Commands #1 to Input Commands #N 620(1) to 620(N) respectively may, for example, be generated by the first to $N^{th}$ Client Devices 420(1) to 420(N) respectively through a user interface or user interfaces such as keyboard, mouse, touch screen, etc. which are then parsed by the Orchestrating Client Device 430. These parsed commands may further include user input commands from the Orchestrating Client Device 430.

Optionally, within embodiments of the invention, the Orchestrating Client Device 430 may prioritise input commands from one or more of the client devices relative to the others or it may prioritise input commands from the Orchestrating Client Device 430 relative to those from the first to $N^{th}$ Client Devices 420(1) to 420(N) respectively.

Optionally, within embodiments of the invention, the Orchestrating Client Device 430 may block input commands from one or more of the client devices or it may block input commands from the Orchestrating Client Device 430.

Referring to second Messaging Flow 600B in FIG. 6B the first to $N^{th}$ Client Devices 420(1) to 420(N) respectively are coupled to Network 102 together with Orchestrating Client Device 430 and Remote Server 440. Accordingly, the different messaging flows are now routed via Network 102, these including but not limited to:

Remote Session Commands 630;

Remote Stream 640;
Parsed Merged Commands 650;
Input Commands #1 to Input Commands #N 620(1) to 620(N); and
Remote Stream Portion #1 to Remote Stream Portion #N 620(1) to 620(N).

It would be evident that in a similar manner to that described and depicted above in respect of first Messaging Flow 600A in FIG. 6A that output commands may also form part of second Messaging Flow 600B in FIG. 6B. Within a first configuration these output commands are generated by the Remote Server 440, communicated to the Orchestrating Client Device 430, parsed by the Orchestrating Client Device 430, and communicated to the first to $N^{th}$ Client Devices 420(1) to 420(N) respectively wherein the communications are all routed via the Network 102. Within another configuration these output commands are generated by the Remote Server 440 and communicated directly to the first to $N^{th}$ Client Devices 420(1) to 420(N) respectively via the Network 440 wherein the Remote Server 440 stores the configuration data of the first to $N^{th}$ Client Devices 420(1) to 420(N) respectively as discussed above in respect of first Messaging Flow 600A in FIG. 6A. This may, for example, be communicated to the Remote Server 400 by the Orchestrating Client Device 430 when the Orchestrating Client Device 430 establishes a session with the session host, namely Remote Server 440. Alternatively it may be stored upon the Remote Server 440, or a database which the Remote Server 440 can access and retrieved by the Remote Server 440 in dependence upon metadata relating to a new session such as identity of user establishing the session, identity of the Orchestrating Client Device 430, or data relating to the session the user wishes to establish.

Figure 7:
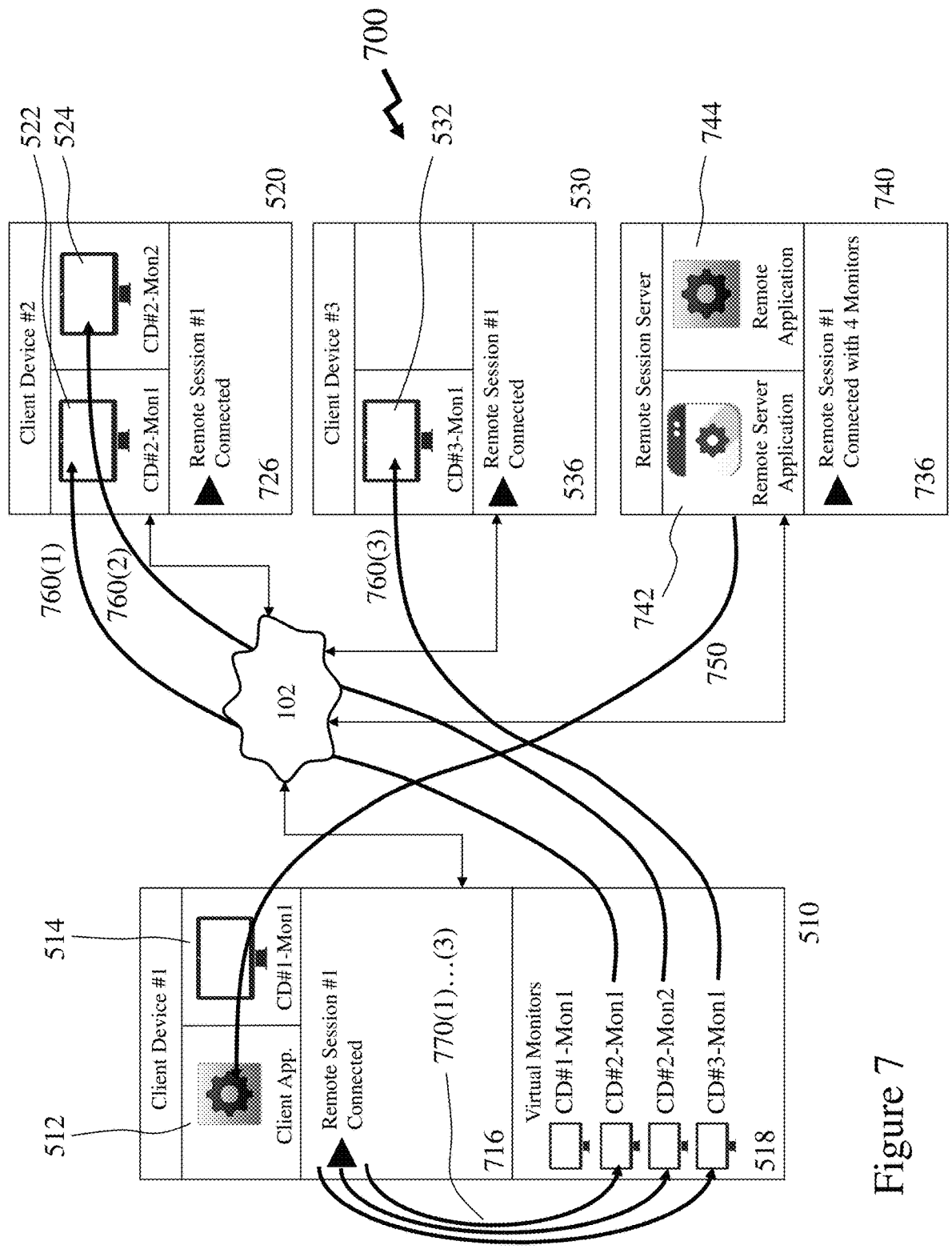
FIG. 7 depicts an exemplary configuration for a main client device orchestrating multiple client devices acting as a proxy remote session host with a remote server prior to after establishment of a remote session according to an embodiment of the invention.

Referring to FIG. 7 there is depicted an exemplary Configuration 700 for a main client device orchestrating multiple client devices acting as a proxy remote session host with a remote server prior to after establishment of a remote session according to an embodiment of the invention. Configuration 700 representing the Configuration 500 in FIG. 5 after establishment of a remote session. Accordingly, Client Device #1 is depicted as having a first Flow 750 with a Remote Server Application 740 comprising Remote Session application 742, Remote Application 744 and Remote Session List 736 which indicates "Remote Session #1 Connected with 4 Monitors." Remote Server Application 742 for example being Parallels Remote Application Server (RAS) whilst Remote Application 744 for example being Parallels Access. The Client Application 512 upon Client Device #1 510 establishing the remote session upon the Remote Session Server 740 via main Flow 750. Now that the remote session has been established the Session List 716 now identifies Remote Session #1 Connected. Virtual Monitor List 518 identifies 4 virtual monitors associated with the Client Device #1, these being:

CD #1-Mon1 514 associated with Client Device #1 510;
CD #2-Mon1 522 associated with Client Device #2 520;
CD #2-Mon2 524 associated with Client Device #2 520; and
CD #3-Mon 1 532 associated with Client Device #3 530.

As CD #1-Mon1 514 is associated with Client Device #1 510 then no other flows are required. However, for the other 3 monitors the Session List 716 has first to third Monitor Flows 770(1) to 770(3) respectively with CD #2-Mon1 522, CD #2-Mon2 524, and CD #3-Mon1 532. The Client Device #1 510 via Virtual Monitor List 518 establishes the following flows:

First Remote Flow 760(1) with CD #2-Mon1 522 associated with Client Device #2 520 through first Monitor Flow 770(1);
Second Remote Flow 760(2) with CD #2-Mon2 524 associated with Client Device #2 520 through second Monitor Flow 770(2); and
Third Remote Flow 760(3) with CD #3-Mon1 532 associated with Client Device #3 530 through third Monitor Flow 770(3).

Accordingly, as discussed above in respect of second to fourth configurations 400B to 400D in FIGS. 4A and 4B and FIG. 6B and as depicted in FIG. 7 these flows are routed via Network 102 and comprise:

main Flow 750 supports Remote Session Commands 630, Remote Stream 640, and Parsed Merged Commands 650;
first Remote Flow 760(1) supports input commands from and remote stream portion to CD #2-Mon1 522 such as Input Commands #1 610(1) and Remote Stream Portion #1 620(1);
second Remote Flow 760(2) supports input commands from and remote stream to from CD #2-Mon2 524 such as Input Commands #2 610(2) and Remote Stream Portion #2 620(2); and
third Remote Flow 760(3) supports input commands from and remote stream portion to CD #3-Mon1 522 such as Input Commands #N 610(1) and Remote Stream Portion #N 620(N).

Alternatively, if FIG. 7 reflects the scenario depicted in first Configuration 400A in FIG. 4A and FIG. 6A then whilst main Flow 750 may be routed via Network 102 the other flows, namely first Remote Flow 760(1), second Remote Flow 760(2), and third Remote Flow 760(3) are communicated from Client Device #1 to Client Devices #2 and #3 520 and 530 respectively directly via wired or wireless interfaces.

Within embodiments of the invention where each client device has a software application installed or established with the remote session that has the configuration of the local monitors associated with that client device. Alternatively, the software application upon the Orchestrating Client Device, e.g. Orchestrating Client Device 430, retrieves this configuration information from each of the client devices. The Orchestrating Client Device registers the Client Devices within its Virtual Monitor List and creates N virtual monitors for the N monitors associated with the client devices, e.g. N=4 within the scenario depicted in FIG. 7. When the Orchestrating Client Device connects to the Remote Session Host, e.g. Remote Session Server, it requests the session to comprise N monitors as denoted by Remote Session List 736 of Remote Session Server 740 in FIG. 7.

Now considering the scenario depicted in first Configuration 400A in FIG. 4A then once the remote session is created and the connection from the Client Application, e.g. Client Application 512 in FIG. 5, is established then the Client Device #1 as depicted in FIG. 7 is the Orchestrating Client Device and receives all remote session data, main Flow 750 in FIG. 7, and splits it among secondary Client Devices, e.g. Client Device #2 520 and Client Device #3, based on the knowledge of which virtual monitor belongs to which client device. This split remote session data being communicated from Client Device #1 510 via first to third Remote Flows 760(1) to 760(3) respectively. Accordingly, the Orchestrating Client Device starts rendering its portion of the full session (its "virtual monitor" CD #1-Mon 1 514) through the Client Application and sending portions of the session data related to other monitors to corresponding to the other Client Devices, namely CD #2-Mon1 522, CD #2-Mon2 524, and CD #3-Mon1 532 within FIG. 7. Each of the Client Devices receives data from the Orchestrating Client Device, decodes it and renders its portion of the remote session on its display(s).

Optionally, within FIG. 7 first and second Remote Flows 760(1) and 760(2) respectively to CD #2-Mon1 522 and CD #2-Mon2 524 may be combined into a single stream from Client Device #1 510 to Client Device #2 520.

In those embodiments of the invention where the Remote Session Server splits the data rather than the Orchestrating Client Device then first to third Remote Flows 760(1) to 760(3) respectively would originate with the Remote Session Server 740. Optionally, in these embodiments of the invention the first and second Remote Flows 760(1) and 760(2) respectively to CD #2-Mon1 522 and CD #2-Mon2 524 may be combined into a single stream from Remote Session Server 540 to Client Device #2 520.

Figure 8:
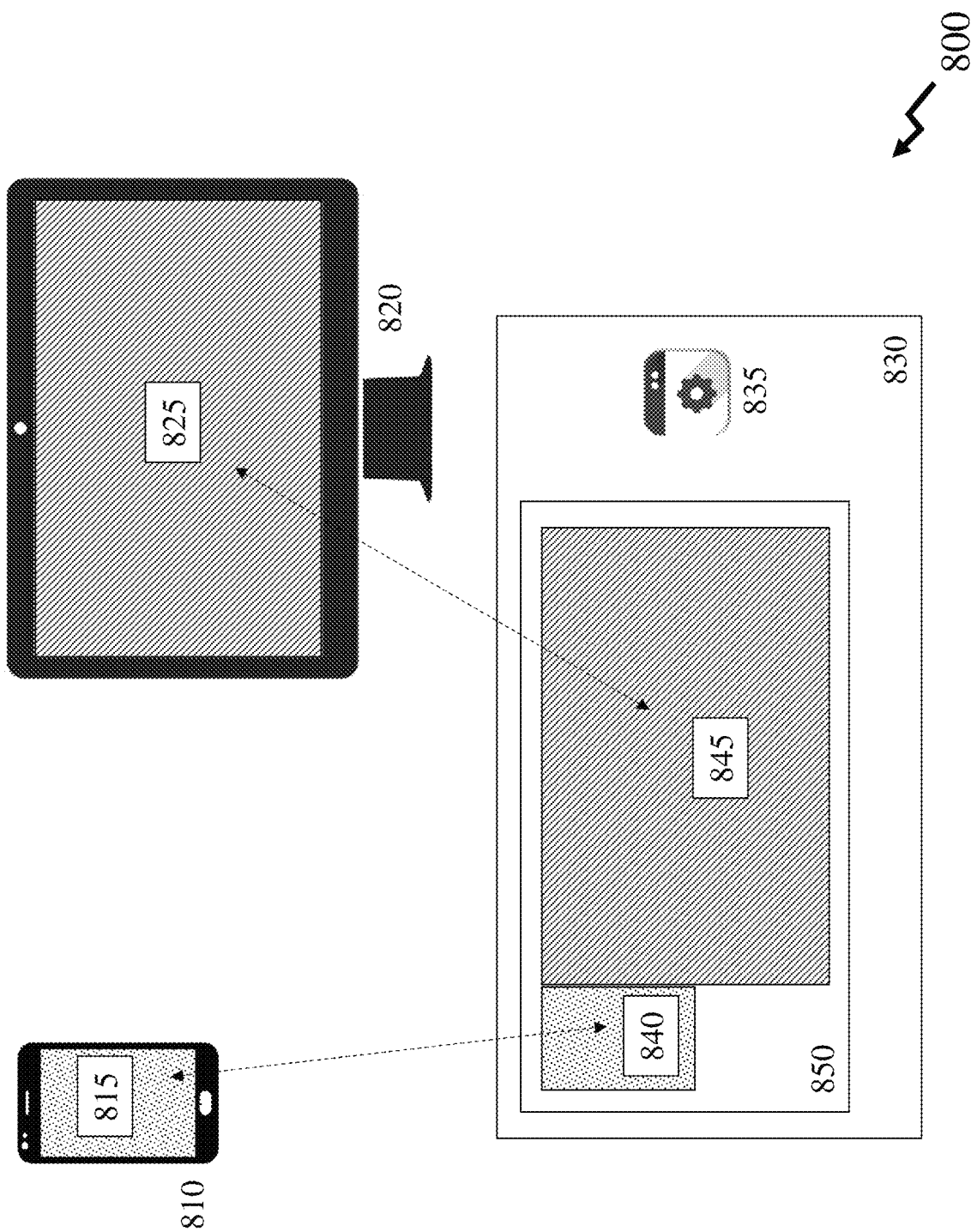
FIG. 8 depicts exemplary mapping of a remote session upon a remote server to a pair of client devices prior to opening of applications within the remote session according to an embodiment of the invention.

Accordingly, referring to FIG. 8 there is depicted an exemplary mapping of a remote session upon a remote server to a pair of client devices prior to opening of applications within the remote session according to an embodiment of the invention. Accordingly, as depicted PED 810 has a first Monitor 815 and FED 820 has a second Monitor 825. Within embodiments of the invention either PED 810 or FED 820 may be the Orchestrating Client Device which establishes the remote session upon the Remote Server 830 which has Remote Server Application 835 in execution, e.g. Remote Server Application 742 in FIG. 7. Based upon the configuration information communicated to the Remote Server Application 835 by the Orchestrating Client Device the Remote Server 830 establishes a remote session configured for use with a pair of monitors, namely those of PED 810 and FED 820. This being depicted conceptually within FIG. 8 as Session Group 850 comprising first Session 840 associated with PED Display 815 of the PED 810 and second Session 845 associated with FED Display 825 of the FED 820.

The terminology of Session Group being employed within this application by the inventors to refer to a conceptual visualization of an overall session established by an orchestrating client device whilst Session is employed to represent a virtual monitor established with respect to a session for each specific client device within the orchestrated session. For example, a Session may be conceptual visualization for an orchestrated session hosted by the session host, e.g. Remote Server 440, where the session host hosts multiple concurrent remote sessions under the framework of the session established by the orchestrating client device with each client device having an associated Session Monitor.

A Session Group may or may not be created by a session host, e.g. Remote Server 440 in FIGS. 4A-4C, 6A and 6B, respectively. A Session Group may be established by the session host representing the content to be rendered to the associated client devices within the overall session orchestrated by the orchestrating client device, Orchestrating Client Device 430 for example.

Within FIG. 8 the PED Display 815 and FED Display 825 which display the remote session to the user(s) of the PED 810 and FED 820 are depicted as filling the respective device display areas. However, within other embodiments of the invention the portions of the PED Display 815 and FED Display 825 rendering graphical user interfaces (GUIs) of the remote session may be a portion of the overall device display areas. Accordingly, the first Session 840 and second Session 845 may be dimensioned to reflect the actual dimensions of the GUIs upon the PED 810 and FED 820, respectively.

Figure 9A:
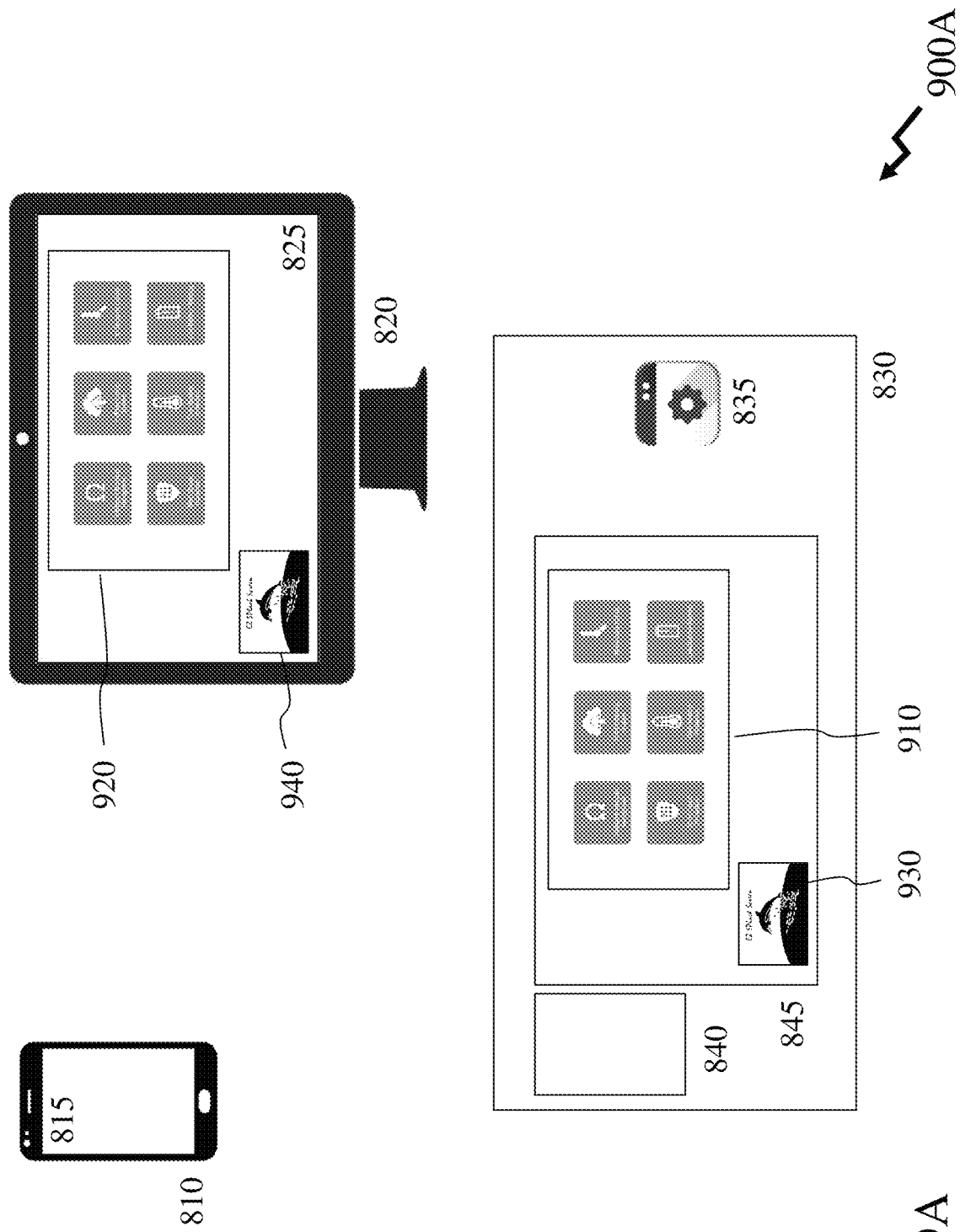
FIGS. 9A and 9B depict exemplary mappings of a remote session upon a remote server to a pair of client devices after applications are opened within the remote session according to an embodiment of the invention.
Figure 9B:
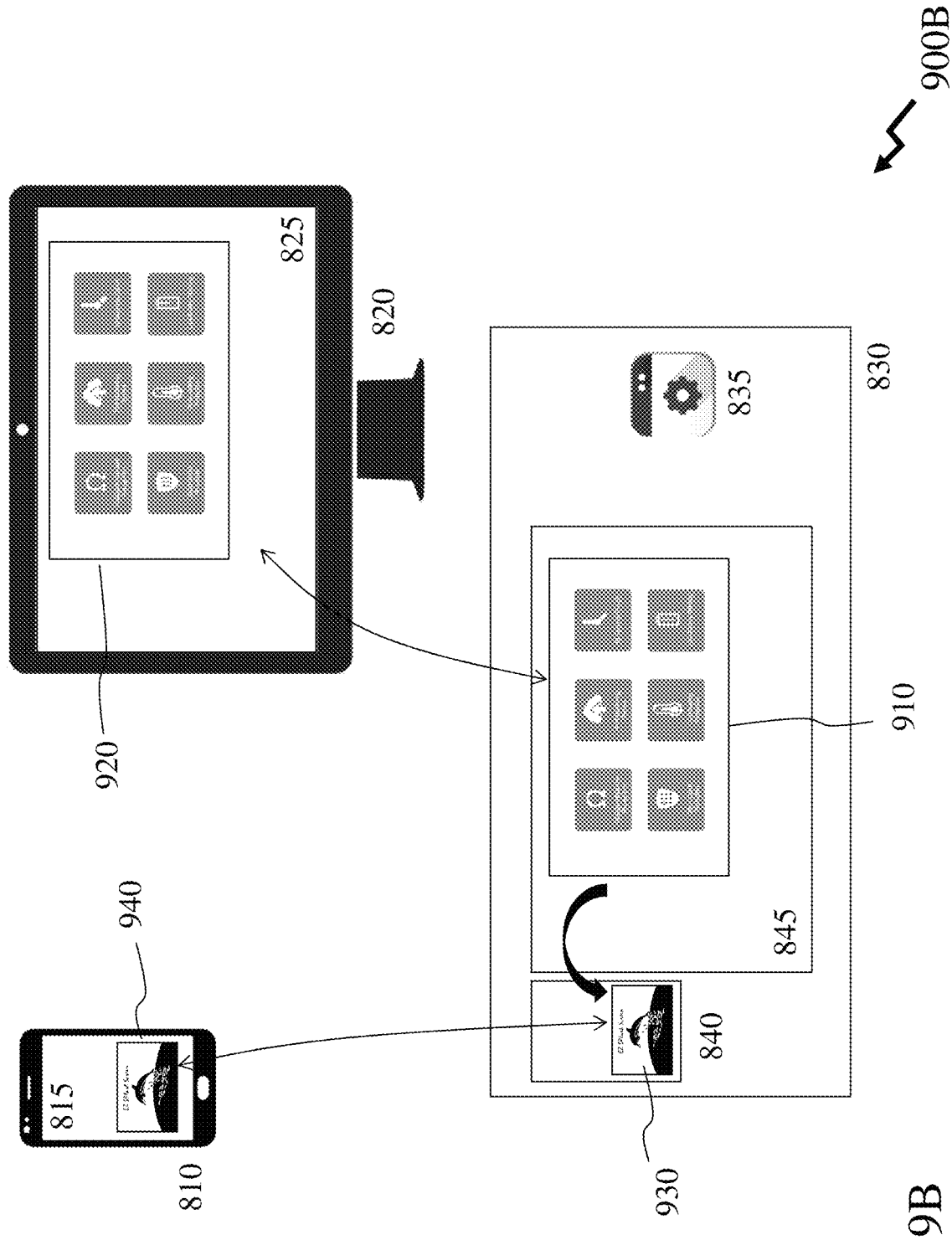

Accordingly, as depicted in FIGS. 9A and 9B there are depicted exemplary mappings of the remote session upon the remote server to the pair of client devices after applications are opened within the remote session according to an embodiment of the invention. Referring initially to FIG. 9A the user has either opened first and second Applications 910 and 930 within the remote session or these are automatically opened based upon stored configuration settings for a remote session for the user. The user establishing the remote session from FED 820. Accordingly, the first and second Applications 910 and 930 are rendered within second Session 845 and upon the FED Display 825 of the FED 820 as third and fourth Applications 920 and 940, respectively. Subsequently, as depicted in FIG. 9B the user via a configuration software application moves the second Application 930 from the second Session 845 to the first Session 840 wherein the fourth Application 940 is now rendered upon the PED Display 815 of the PED 810 and the first Session 840 depicts the second Application 930.

Figure 9C:
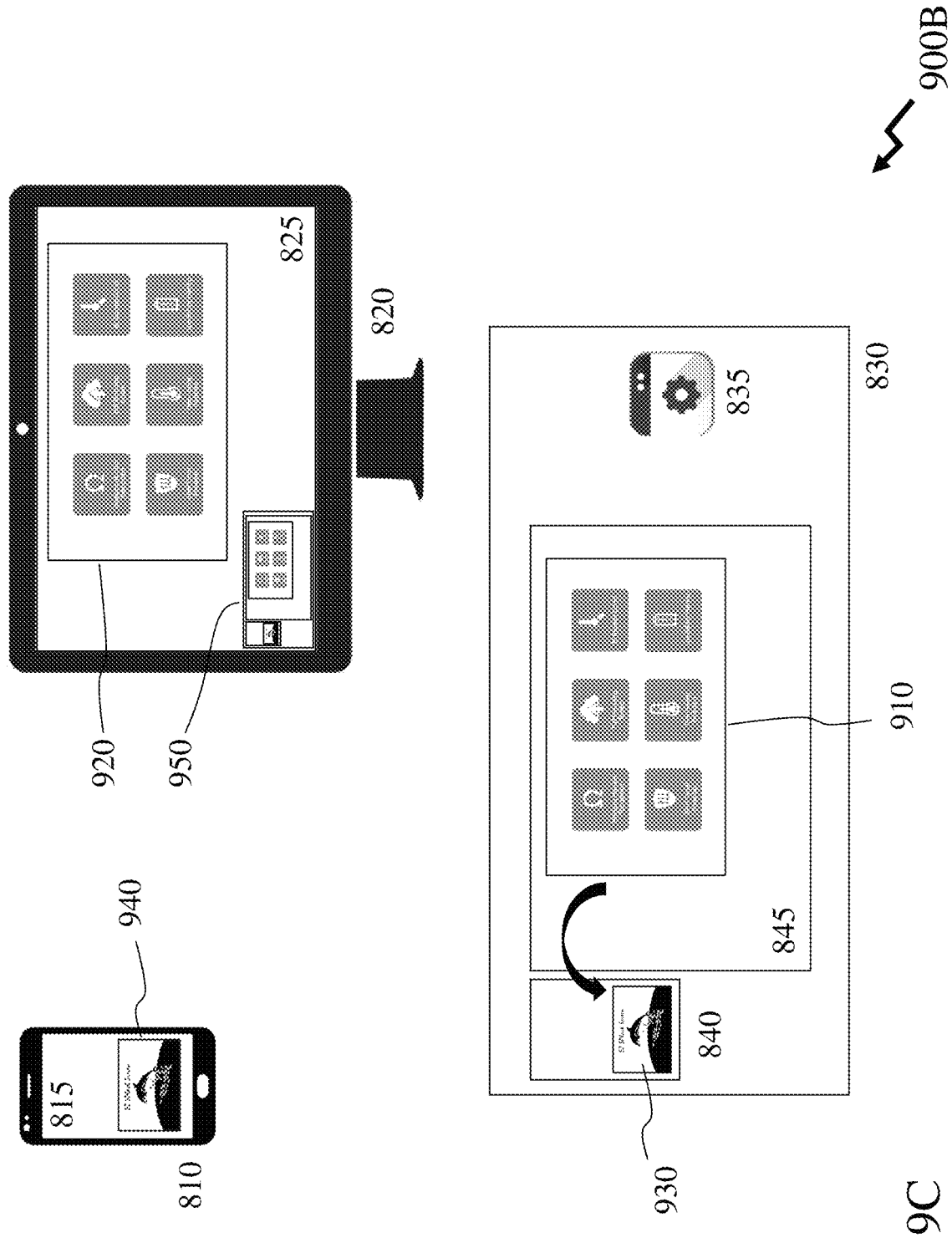
FIG. 9C depicts a configuration software application within a remote session according to an embodiment of the invention allowing a user to manipulate applications within the remote session across the multiple monitors (devices)

The configuration software application may be a discrete application to that establishing the remote session for the user or be an application rendered within the remote session automatically. This may be rendered, such as depicted in FIG. 9C, within FED Display 825 as Application Window 950 when the remote session is initiated and controlled from the FED 820. Alternatively, it may be rendered within PED Display 815 when the remote session is initiated and controlled from the PED 810.

Figure 10:
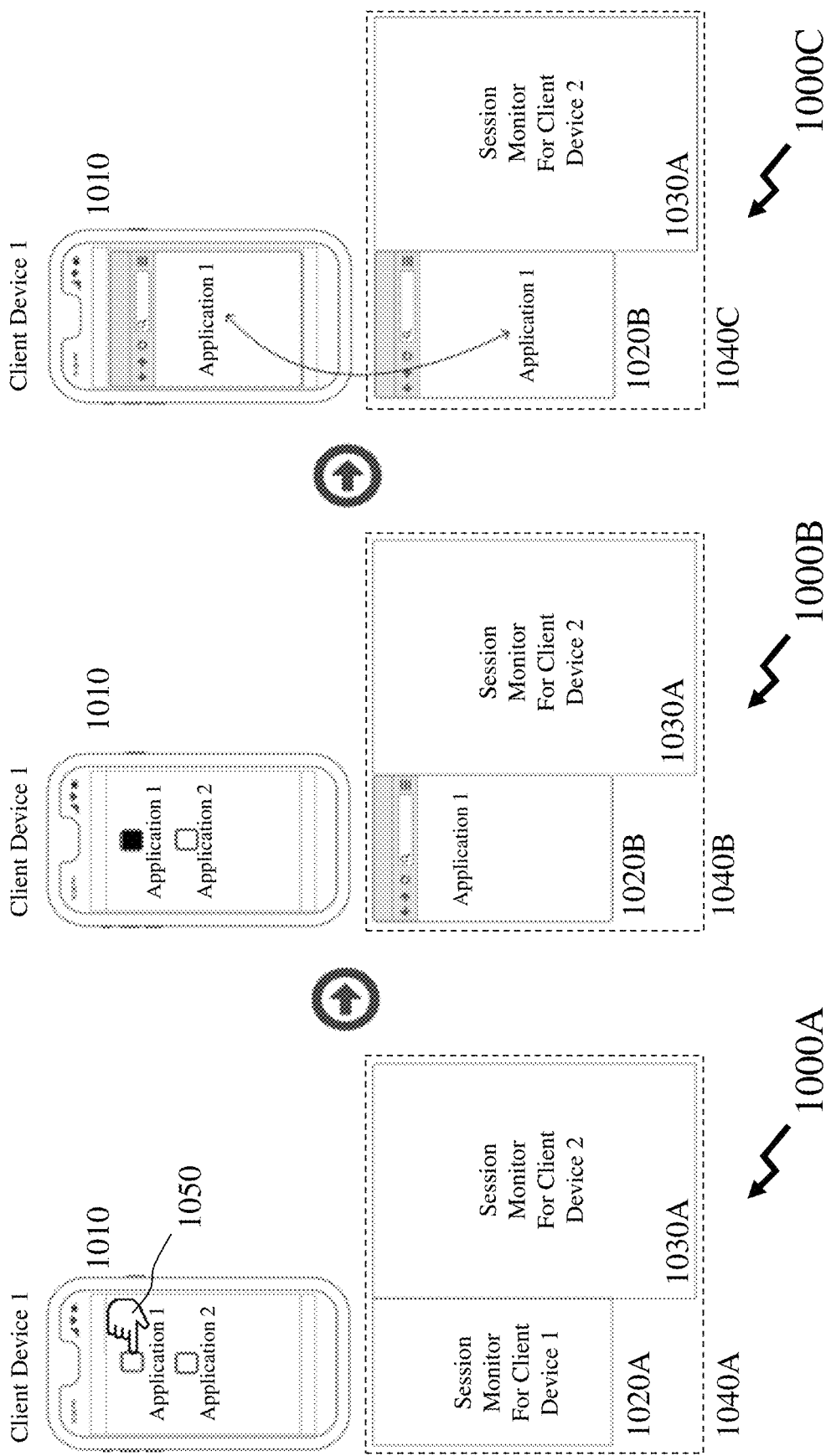
FIG. 10 depicts an exemplary process flow of opening an application upon a main client device within a remote session according to an embodiment of the invention according.

Now referring to FIG. 10 there is depicted an exemplary process flow comprising first to third steps 1000A to 1000C respectively for opening an application upon a main client device within a remote session according to an embodiment of the invention according. Referring initially to first step 1000A a user has a remote session established upon their PED 1010A which identifies two applications, Application 1 and Application 2. Upon the remote server the first Session Group 1040A for the remote session comprises first Session 1020A for Client Device 1, PED 1010, and second Session 1030A for a Client Device 2, which is not depicted for clarity. In first step 1000A the user is selecting Application 1 via Action 1050. Accordingly, the Session Group 1040A represents the remote sessions within the session stated by an orchestrating client device wherein each session of the Session Group is associated with a client device. As will become evident from second and third steps 1000B and 1000C in FIG. 10 and first to third steps 1100A to 1100C of FIG. 11 an application window (window) can be moved from one session to another session simply through actions of a user moving the window within the session group through commands entered by the user, through actions with respect to a graphical user interface made by the user, automatically based upon rules associated with the session, client device(s), state of the application, content accessed within the application etc.

In second step 1000B the remote session opens the first application thereby generating second Session Group 1040B wherein the first application is now displayed within the second Session 1020B whilst nothing is loaded to second Session 1030A. Subsequently, in third step 1000C the remote session transfers the third Session 1020B to the PED 1010 such that the third Session 1020B is rendered on the PED 1010. Accordingly, within the embodiment of the invention described and depicted with respect to FIG. 10 the remote session generates a window for rendering upon a device, e.g. third Session 1020B on PED 1010, before it is transferred to the PED 1010. Such a process being as described with respect to FIGS. 4 to 6B where the remote server streams the content to be rendered.

If the PED 1010 as Orchestrating Client Device was part of a system such as described and depicted in respect of first Configuration 400A in FIG. 4A and FIG. 6A then the PED 1010 would also subsequently receive any content established by the remote session within second Session 1030A which it would then provide to Client Device 2.

If the PED 1010 as Orchestrating Client Device was part of a system such as described and depicted in respect of second to fourth configurations 400B to 400D in FIGS. 4A and 4B together with FIG. 6A then the PED 1010 would not subsequently receive any content established by the remote session within second Session 1030A as this would be provided directly from the remote server to the Client Device 2.

Figure 11:
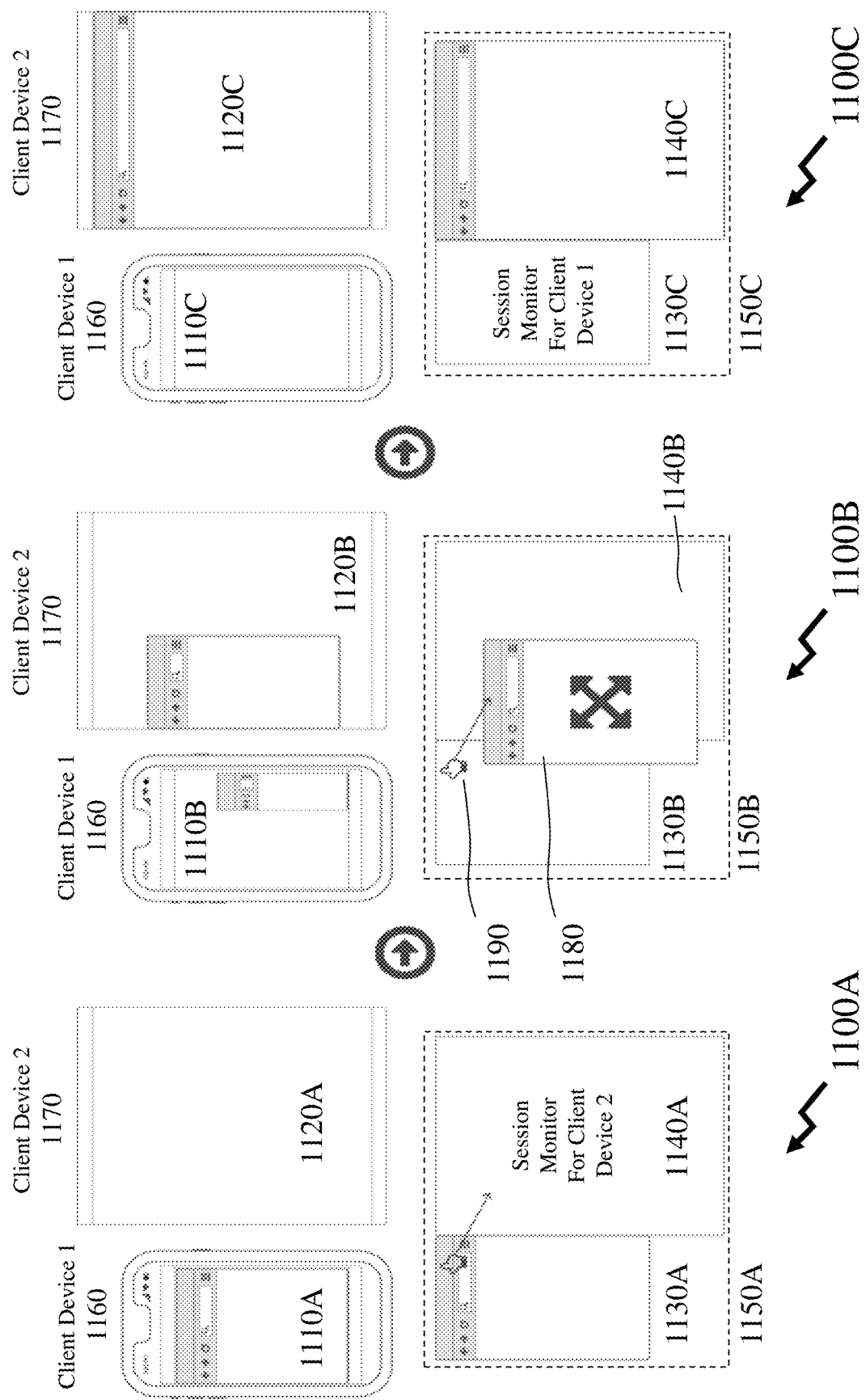
FIG. 11 depicts an exemplary process flow of moving an application from one client device to another client device within a remote session according to an embodiment of the invention.

Now referring to FIG. 11 there are depicted first to third steps 1100A to 1100C of an exemplary process flow of moving an application from one client device to another client device within a remote session according to an embodiment of the invention. These steps performing the process within embodiments of the invention as described in respect of FIGS. 9A and 9B. Accordingly, first step 1100A corresponds to third step 1000C in FIG. 10C wherein an application, Application 1, has been established with first Session Group 1150A at the remote server within first Session 1130A for Client Device 1 together with second Session 1140A for Client Device 2. Client Device 1 1160 being depicted as displaying first Session Group 1130A as first GUI 1110A whilst second GUI 1120A on Client Device 2 1170 depicts second Session Group 1140A, currently blank.

In second step 1100B the user, via a software application which renders the Session Group, is moving the Application 1180 via Action 1190 which is currently overlaying both first Session Group 1130B and second Session Group 1140B such that these portions are rendered to the user(s) as third GUI 1110B upon Client Device 1 1160 and fourth GUI 1120B upon Client Device 2 1170. Third step 1100C depicts a subsequent point where the user as moved the window of Application 1 completely onto second Virtual Window 1140C such that first Session Group 1130C is now blank. Accordingly, fifth GUI 1110C on Client Device 1160 is blank, being first Session Group 1130C transmitted to Client Device 1 1160 whilst sixth GUI 1120C on Client Device 2 1170 depicts the rendered application within second Session Group 1140C which has been transmitted to Client Device 2 1170.

Accordingly, a single user may move an application from one monitor or electronic device to another monitor or electronic device within a remote session or may move an application from another monitor or electronic device for another user to view and/or interact with.

It would be evident that the process may employed in reverse order from third step 1100C to first step 1100A thereby moving an application from Client Device 2 1170 to Client Device 1 1160.

It would be evident that within embodiments of the invention that where the monitors (displays) forming part of Client Device 1 1160 and Client Device 2 1170 upon which the remote session is rendered are touch sensitive screens (touch screens) that the user(s) may interact with the remote session through each of the rendered displays upon the Client Device 1 1160 and Client Device 2 1170.

Optionally, a configuration setting of the software application executing upon or accessed by the Orchestrating Client Device may block inputs from another client device so that the user can only view the rendered content. This may, within embodiments of the invention exploiting a configuration such as first Configuration 400A in FIG. 4A be achieved by the Orchestrating Client Device, e.g. Main Device 430, blocking commands from one or more client devices which are received so that these are not transmitted to the remote server.

Within other embodiments of the invention such as second to fourth Configurations 400B to 400C in FIGS. 4A and 4B where commands are directly transmitted from client devices to the remote server the Orchestrating Client Device may transmit configuration settings to the remote server such that is a particular client device is to be blocked from providing inputs then the remote server disregards communications from the client device(s) identified by the Orchestrating Client Device as being blocked.

Optionally, with a configuration such as fourth Configuration 400D in FIG. 4B wherein a first Client Device 420(1) has a Keyboard 450A associated with it whilst second Client Device 420(N) has a Mouse 450B then the Orchestrating Client Device may obtain configuration information from each client device and provide the user of the Orchestrating Client Device with the ability to enable/disable specific interfaces of each client device. For example, Orchestrating Client Device may block keyboard entry from Keyboard 450A for the user of first Client Device 420(1) whilst enabling mouse entry from Mouse 450B for the user of second Client Device 420(N).

Optionally, within embodiments of the invention the configuration of a remote session, such as described in FIG. 7 with respect to Client Device #1 510, Client Device #2 520, and Client Device #3 530 with a total of 4 monitors may be pre-configured with respect to the remote session established by Client Device #1 as Orchestrating Client Device.

Optionally, as user may therefore exploit the display, input interfaces, and output interfaces of a client device with their Orchestrating Client Device. For example, a remote session upon a user's PED, e.g. a smartphone, can include their desktop as a client device such the display of the desktop is employed, a keyboard (if presented) of the desktop may be employed for entering commands/data etc. as may a pointing device such as a mouse, for example. Further other output devices other than the display such as loudspeakers, etc. may be employed.

Optionally, the Orchestrating Client Device may store multiple remote session configuration wherein the user selects a remote session configuration for the remote session when initiating the remote session.

Optionally, the Orchestrating Client Device may configure the remote session dynamically such that another client device is added to the remote session once the remote session has been established. For example, a user may establish a remote session upon their PED and then associate a PED of another user to the remote session by adding the client device to the remote session through a software application allowing the remote session configuration to be established/modified such that the remote server knows how the remote session is structured in terms of virtual windows and whether the content to be rendered for each virtual window should be transmitted to the Orchestrating Client Device or directly to each client device.

Optionally, the Orchestrating Client Device may configure the remote session dynamically such that another client device is added to the remote session once the remote session has been established. This may be by providing a remote session identifier and security credentials to another client device such that these are provided to a remote system upon the client device establishing another remote session and the remote system associates the client device to the same remote session as that established by the Orchestrating Client Device.

Optionally, the Orchestrating Client Device may associate another client device automatically based upon the other client device having an identity within an approved client device list of the Orchestrating Client Device. Accordingly, a user may establish a remote session upon their PED, automatically add a client device, e.g. a FED or another PED, by their PED establishing a wireless connection (e.g. Bluetooth), and subsequently automatically remove the other client device once the wireless association is closed or no longer active/valid etc. Accordingly, the remote session is maintained upon their Orchestrating Client Device under all subsequent associations etc.

Within embodiments of the invention a user may, within the session, open a new application, close an application, move an application, resize an application wherein these actions are reflected with virtual window upon the remote system and therein in the content streamed (distributed) to each of the orchestrating client device and the one or more client devices.

It would be evident to one of skill that actions with respect to an application, e.g. entering content, deleting content, moving content, playing audiovisual content etc. would be streamed (distributed) to the orchestrating client device and the one or more client devices rendering that application.

Within embodiments of the invention the virtual window may be rendered in its entirety to each of the orchestrating client device and the one or more client devices so that all devices render the remote session. This may allow a user to share a remote session so that all users presented with the remote session may interact with the same application(s) within the remote session rather than some users seeing different applications to other users based upon the mapping of the virtual window to the orchestrating client device and the one or more client devices.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other mediums capable of storing, containing, or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one or more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. One or more non-transitory computer-readable storage media comprising executable instructions that, when executed by one or more processors forming part of an electronic device, cause the one or more processors to:
define a virtual session group for a remote session between a remote system and the electronic device, the virtual session group defining virtual sessions for the electronic device and one or more client devices forming part of the remote session;
define a first portion of the remote session for the electronic device which is established in dependence upon a virtual session of the virtual session group associated with the electronic device; and
define a second portion of the remote session for each client device of the one or more client devices, each second portion of the remote session is established in dependence upon a virtual session of the virtual session group associated with that client device of the one or more client devices; wherein
the executable instructions further cause the one or more processors to:
receive all of the content to be rendered upon the electronic device and the one or more client devices from the remote system;
generate the one or more second portions of the remote session for the one or more client devices; and
transmit the one or more second portions of the remote session for the one or more client devices to the one or more client devices.

2. One or more non-transitory computer-readable storage media comprising executable instructions that, when executed by one or more processors forming part of an electronic device, cause the one or more processors to:
define a virtual session group for a remote session between a remote system and the electronic device, the virtual session group defining virtual sessions for the electronic device and one or more client devices forming part of the remote session;
define a first portion of the remote session for the electronic device which is established in dependence upon a virtual session of the virtual session group associated with the electronic device; and
define a second portion of the remote session for each client device of the one or more client devices, each second portion of the remote session is established in dependence upon a virtual session of the virtual session group associated with that client device of the one or more client devices; wherein
the executable instructions further cause the one or more processors to:
receive all of the content to be rendered upon the electronic device and the one or more client devices from the remote system;
render the first portion of the remote session on a display associated with the electronic device; and
transmit the one or more second portions of the remote session for the one or more client devices to the one or more client devices.

3. One or more non-transitory computer-readable storage media comprising executable instructions that, when executed by one or more processors forming part of an electronic device, cause the one or more processors to:
define a virtual session group for a remote session between a remote system and the electronic device, the virtual session group defining virtual sessions for the electronic device and one or more client devices forming part of the remote session;
define a first portion of the remote session for the electronic device which is established in dependence upon a virtual session of the virtual session group associated with the electronic device; and
define a second portion of the remote session for each client device of the one or more client devices, each second portion of the remote session is established in dependence upon a virtual session of the virtual session group associated with that client device of the one or more client devices; wherein the executable instructions further cause the one or more processors to:
- receive first data generated with respect to the remote session by each client device of one or more client devices;
- parse the first data received from the one or more client devices and second data generated with respect to the remote session;
- transmit the parsed first data and second data to the remote system;
- receive from the remote system a modified first portion of the remote session and one or more modified second portions of the remote session which were generated by the remote system in dependence upon the parsed first data and second data transmitted from the electronic device to the remote system; and
- transmit the one or more modified second portions to the one or more client devices.

4. One or more non-transitory computer-readable storage media comprising executable instructions that, when executed by one or more processors forming part of an electronic device, cause the one or more processors to:
- define a virtual session group for a remote session between a remote system and the electronic device, the virtual session group defining virtual sessions for the electronic device and one or more client devices forming part of the remote session;
- define a first portion of the remote session for the electronic device which is established in dependence upon a virtual session of the virtual session group associated with the electronic device; and
- define a second portion of the remote session for each client device of the one or more client devices, each second portion of the remote session is established in dependence upon a virtual session of the virtual session group associated with that client device of the one or more client devices; wherein the executable instructions further cause the one or more processors to:
- receive first data generated with respect to the remote session by each client device of one or more client devices;
- parse the first data received from the one or more client devices and second data generated with respect to the remote session;
- transmit the parsed first data and second data to the remote system; and
- receive from the remote system a modified first portion of the remote session generated by the remote system in dependence upon the parsed first data and second data transmitted from the electronic device to the remote system; and one or more other non-transitory computer-readable storage media associated with the remote system comprise other executable instructions that, when executed by one or more other processors forming part of the remote system, cause the one or more other processors to:
- generates the modified first portion of the remote session and one or more modified second portions of the remote session in dependence upon the parsed first data and second data;
- transmit the modified first portion of the remote session to the electronic device; and
- transmit each modified second portion of the one or more modified second portions to the client device of the one or more client devices associated with the modified second portion.

5. One or more non-transitory computer-readable storage media comprising executable instructions that, when executed by one or more processors forming part of an electronic device, cause the one or more processors to:
- define a virtual session group for a remote session between a remote system and the electronic device, the virtual session group defining virtual sessions for the electronic device and one or more client devices forming part of the remote session;
- define a first portion of the remote session for the electronic device which is established in dependence upon a virtual session of the virtual session group associated with the electronic device; and
- define a second portion of the remote session for each client device of the one or more client devices, each second portion of the remote session is established in dependence upon a virtual session of the virtual session group associated with that client device of the one or more client devices; wherein the executable instructions further cause the one or more processors to receive modified first portion of the remote session from the remote system; and one or more other non-transitory computer-readable storage media associated with the remote system comprise other executable instructions that, when executed by one or more other processors forming part of the remote system, cause the one or more other processors to:
- receive first data from each client device of the one or more client device generated with respect to the remote session by each client device of one or more client devices;
- receive second data generated with respect to the remote session from the electronic device;
- parse the first data received from the one or more client devices and second data from the electronic device;
- generate the modified first portion of the remote session in dependence upon the parsed first data and second data;
- generate one or more modified second portions of the remote session in dependence upon the parsed first data and second data;
- transmit the modified first portion of the remote session to the electronic device; and
- transmit each modified second portion of the one or more modified second portions to the client device of the one or more client devices associated with the modified second portion.

6. One or more non-transitory computer-readable storage media comprising executable instructions that, when executed by one or more processors forming part of an electronic device, cause the one or more processors to:
- define a virtual session group for a remote session between a remote system and the electronic device, the virtual session group defining virtual sessions for the electronic device and one or more client devices forming part of the remote session;
- define a first portion of the remote session for the electronic device which is established in dependence upon a virtual session of the virtual session group associated with the electronic device; and
- define a second portion of the remote session for each client device of the one or more client devices, each second portion of the remote session is established in dependence upon a virtual session of the virtual session group associated with that client device of the one or more client devices; wherein the executable instructions further cause the one or more processors to:
  provide a user of the electronic device with access to a software application; and
  receive input from the user with respect to the software application;

one or more other non-transitory computer-readable storage media associated with the remote system comprise other executable instructions that, when executed by one or more other processors forming part of the remote system, cause the one or more other processors to:
  receive the input from the user with respect to the software application;
  update a virtual window of the remote session to reflect the received input; and
  generate a modified first portion of the remote session and one or more modified second portions of the remote session in dependence upon the updated virtual window;

the input relates to at least one of opening an application of the one or more applications, closing an application of the one or more applications, moving an application of the one or more applications, and resizing an application of the one or more applications; and the one or more applications are associated with the remote session.

* * * * *